US012302393B2

(12) United States Patent
Liu et al.

(10) Patent No.: US 12,302,393 B2
(45) Date of Patent: May 13, 2025

(54) RATE MATCHING FOR UNLICENSED SIDELINK CHANNEL ACCESS

(71) Applicant: QUALCOMM Incorporated, San Diego, CA (US)

(72) Inventors: Chih-Hao Liu, San Diego, CA (US); Jing Sun, San Diego, CA (US); Yisheng Xue, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 360 days.

(21) Appl. No.: 17/840,157

(22) Filed: Jun. 14, 2022

(65) Prior Publication Data

US 2023/0403738 A1    Dec. 14, 2023

(51) Int. Cl.
| | |
|---|---|
| *H04W 74/0816* | (2024.01) |
| *H04L 1/00* | (2006.01) |
| *H04L 5/00* | (2006.01) |
| *H04W 72/02* | (2009.01) |
| *H04W 72/0446* | (2023.01) |
| *H04W 72/1263* | (2023.01) |

(Continued)

(52) U.S. Cl.
CPC ....... *H04W 74/0816* (2013.01); *H04L 1/0067* (2013.01); *H04L 5/0051* (2013.01); *H04W 72/02* (2013.01); *H04W 72/0446* (2013.01); *H04W 72/1263* (2013.01); *H04W 74/002* (2013.01); *H04W 74/0866* (2013.01)

(58) Field of Classification Search
CPC ........... H04W 74/0816; H04W 74/002; H04W 74/0866; H04L 1/0067; H04L 5/0051; H04L 72/0046; H04L 72/1263
See application file for complete search history.

(56) References Cited

U.S. PATENT DOCUMENTS

| | | | |
|---|---|---|---|
| 11,683,800 B2 * | 6/2023 | Liu ........................ | H04W 72/20 370/329 |
| 2018/0323935 A1 * | 11/2018 | Yerramalli ............ | H04W 72/23 |

(Continued)

FOREIGN PATENT DOCUMENTS

| | | | | |
|---|---|---|---|---|
| EP | 4270851 A2 * | 11/2023 | ............. | H04L 5/003 |
| WO | WO-2016048222 A1 * | 3/2016 | ......... | H04L 27/0006 |

(Continued)

*Primary Examiner* — Shean Tokuta
(74) *Attorney, Agent, or Firm* — Holland & Hart LLP

(57) ABSTRACT

Methods, systems, and devices for wireless communications are described. A transmitting user equipment may receive control information indicative of a plurality of starting symbols in a first slot, the plurality of starting symbols including at least one default starting symbol and one or more subsequent starting symbols, each of the plurality of starting symbols representing a potential starting symbol for transmission, by the transmitting UE, of a sidelink communication. The transmitting UE may perform a listen-before-talk procedure during at least the first slot and may transmit, to a receiving UE and based on performance of the listen-before-talk procedure during at least the first slot, at least an initial portion of the sidelink communication during a selected starting symbols of the plurality of starting symbols, the selected starting symbol being one of the one or more subsequent starting symbols and representing a beginning of a channel occupancy duration.

28 Claims, 16 Drawing Sheets

(51) Int. Cl.
    *H04W 74/00*     (2009.01)
    *H04W 74/08*     (2024.01)

(56)     References Cited

U.S. PATENT DOCUMENTS

| | | | | |
|---|---|---|---|---|
| 2019/0132103 | A1* | 5/2019 | Yang | H04W 72/121 |
| 2019/0306923 | A1* | 10/2019 | Xiong | H04J 13/0062 |
| 2020/0383105 | A1* | 12/2020 | Park | H04L 1/1896 |
| 2021/0084683 | A1* | 3/2021 | Li | H04W 72/23 |
| 2021/0250931 | A1* | 8/2021 | Yang | H04W 72/20 |
| 2022/0174736 | A1* | 6/2022 | Oviedo | H04L 5/0053 |
| 2023/0146718 | A1* | 5/2023 | Lei | H04L 1/1607 |
| | | | | 370/329 |
| 2023/0180015 | A1* | 6/2023 | Si | H04W 16/14 |
| | | | | 370/329 |
| 2023/0354374 | A1* | 11/2023 | Rastegardoost | H04W 72/04 |
| 2023/0403738 | A1* | 12/2023 | Liu | H04L 1/0067 |
| 2024/0040567 | A1* | 2/2024 | Liu | H04W 72/20 |
| 2024/0057126 | A1* | 2/2024 | Liu | H04W 72/25 |
| 2024/0114529 | A1* | 4/2024 | Cheng | H04W 72/0453 |
| 2024/0129936 | A1* | 4/2024 | Ganesan | H04W 72/40 |

FOREIGN PATENT DOCUMENTS

| | | | | |
|---|---|---|---|---|
| WO | WO-2016072220 | A1 * | 5/2016 | H04B 17/318 |
| WO | WO-2020027533 | A1 * | 2/2020 | H04L 5/001 |
| WO | WO-2020198735 | A1 * | 10/2020 | H04L 1/1893 |
| WO | WO-2020204449 | A1 * | 10/2020 | H04W 16/14 |

* cited by examiner

RATE MATCHING FOR UNLICENSED SIDELINK CHANNEL ACCESS

FIELD OF TECHNOLOGY

The following relates to wireless communications, including rate matching for unlicensed sidelink channel access.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless multiple-access communications system may include one or more base stations, each supporting wireless communication for communication devices, which may be known as user equipment (UE). Some such communications systems may support sidelink communications (e.g., device-to-device communications) in unlicensed frequency bands (SL-U). In some cases, SL-U communications may be slot-based and may include transmissions that are initiated at or near a slot boundary.

SUMMARY

The described techniques relate to improved methods, systems, devices, and apparatuses that support rate matching for unlicensed sidelink channel access. For example, the described techniques provide for improved channel access in sidelink unlicensed (SL-U) communications. For example, a transmitting user equipment (UE) may receive an indication of a set of starting symbols within a slot. In some examples, the set of starting symbols may include a default starting symbol near or at a slot boundary and may include one or more non-default starting symbols. Based on clearing a listen-before-talk (LBT) procedure (e.g., determining the channel or transmission medium is available (e.g., idle), the transmitting UE may initiate sidelink transmission at a next available starting symbol of the set (e.g., an earliest starting symbol occurring after the LBT procedure) which may be a default or a non-default starting symbol thus increasing efficiency by avoiding a waiting period for a next available default starting symbol. That is, implementing dynamic starting symbols may enable a transmitting UE to begin sidelink transmission (e.g., physical sidelink control channel (PSCCH) and physical sidelink shared channel (PSSCH) transmission(s)) at a next available starting symbol (e.g., default, non-default) after clearing a LBT and may enable the transmitting UE to default to initiating transmissions during subsequent slots during a default symbol (e.g., during a first occurring starting symbol).

Such sidelink transmissions may include sidelink control information (SCI) and demodulation reference signals (DMRSs). Alternatively, the sidelink transmission may not include SCI and DMRSs until the beginning of a next slot after the starting symbol. In some such examples, where no SCI is included in the first symbol, the SCI may be provided in a subsequent slot and the first slot may be rate matched with transmissions occurring during other slots.

A method for wireless communication at a transmitting user equipment (UE) is described. The method may include receiving control information indicative of a set of multiple starting symbols in a first slot, the set of multiple starting symbols being within a resource pool for unlicensed sidelink communication, the set of multiple starting symbols including at least one default starting symbol and one or more subsequent starting symbols, each of the set of multiple starting symbols representing a potential starting symbol for transmission, by the transmitting UE, of a sidelink communication after the transmitting UE participates in a listen-before-talk procedure, performing the listen-before-talk procedure during at least the first slot, and transmitting, to a receiving UE and based on performance of the listen-before-talk procedure during at least the first slot, at least an initial portion of the sidelink communication during a selected starting symbol of the set of multiple starting symbols, the selected starting symbol being one of the one or more subsequent starting symbols and representing a beginning of a channel occupancy duration of the transmitting UE.

An apparatus for wireless communication at a transmitting UE is described. The apparatus may include a processor, memory coupled with the processor, and instructions stored in the memory. The instructions may be executable by the processor to cause the apparatus to receive control information indicative of a set of multiple starting symbols in a first slot, the set of multiple starting symbols being within a resource pool for unlicensed sidelink communication, the set of multiple starting symbols including at least one default starting symbol and one or more subsequent starting symbols, each of the set of multiple starting symbols representing a potential starting symbol for transmission, by the transmitting UE, of a sidelink communication after the transmitting UE participates in a listen-before-talk procedure, perform the listen-before-talk procedure during at least the first slot, and transmit, to a receiving UE and based on performance of the listen-before-talk procedure during at least the first slot, at least an initial portion of the sidelink communication during a selected starting symbol of the set of multiple starting symbols, the selected starting symbol being one of the one or more subsequent starting symbols and representing a beginning of a channel occupancy duration of the transmitting UE.

Another apparatus for wireless communication at a transmitting UE is described. The apparatus may include means for receiving control information indicative of a set of multiple starting symbols in a first slot, the set of multiple starting symbols being within a resource pool for unlicensed sidelink communication, the set of multiple starting symbols including at least one default starting symbol and one or more subsequent starting symbols, each of the set of multiple starting symbols representing a potential starting symbol for transmission, by the transmitting UE, of a sidelink communication after the transmitting UE participates in a listen-before-talk procedure, means for performing the listen-before-talk procedure during at least the first slot, and means for transmitting, to a receiving UE and based on performance of the listen-before-talk procedure during at least the first slot, at least an initial portion of the sidelink communication during a selected starting symbol of the set of multiple starting symbols, the selected starting symbol being one of the one or more subsequent starting symbols and representing a beginning of a channel occupancy duration of the transmitting UE.

A non-transitory computer-readable medium storing code for wireless communication at a transmitting UE is described. The code may include instructions executable by a processor to receive control information indicative of a set of multiple starting symbols in a first slot, the set of multiple starting symbols being within a resource pool for unlicensed sidelink communication, the set of multiple starting symbols including at least one default starting symbol and one or more subsequent starting symbols, each of the set of multiple starting symbols representing a potential starting symbol for transmission, by the transmitting UE, of a sidelink communication after the transmitting UE participates in a listen-before-talk procedure, perform the listen-before-talk procedure during at least the first slot, and transmit, to a receiving UE and based on performance of the listen-before-talk procedure during at least the first slot, at least an initial portion of the sidelink communication during a selected starting symbol of the set of multiple starting symbols, the selected starting symbol being one of the one or more subsequent starting symbols and representing a beginning of a channel occupancy duration of the transmitting UE.

In some examples of the method, apparatuses, and non-transitory computer-readable medium described herein, transmitting at least the initial portion of the sidelink communication during the selected starting symbol may include operations, features, means, or instructions for transmitting at least the initial portion during a next available starting symbol of the set of multiple starting symbols after the performance of the listen-before-talk procedure, the next available starting symbol being the selected starting symbol.

Some examples of the method, apparatuses, and non-transitory computer-readable medium described herein may further include operations, features, means, or instructions for transmitting a second sidelink communication during the channel occupancy time, transmission of the second sidelink communication starting during a default starting symbol of a second slot that may be subsequent to the first slot.

Some examples of the method, apparatuses, and non-transitory computer-readable medium described herein may further include operations, features, means, or instructions for scheduling the receiving UE to receive the sidelink communication during the first slot and after the listen-before-talk procedure based on a capability of the receiving UE.

In some examples of the method, apparatuses, and non-transitory computer-readable medium described herein, transmitting at least the initial portion of the sidelink communication during the selected starting symbol may include operations, features, means, or instructions for rate matching transmission of the sidelink communication during the first slot based on a set of data channel resource elements scheduled during a second slot of the channel occupancy duration and transmitting the sidelink communication during the first slot based on the rate matched set of data channel resource elements.

In some examples of the method, apparatuses, and non-transitory computer-readable medium described herein, transmitting the sidelink communication during the first slot based on the rate matched set of data channel resource elements may include operations, features, means, or instructions for refraining from transmitting sidelink control information during the selected starting symbol of the first slot.

Some examples of the method, apparatuses, and non-transitory computer-readable medium described herein may further include operations, features, means, or instructions for transmitting the sidelink control information during the second slot, the sidelink control information including an indication of the rate matching, an indication of the selected starting symbol in the first slot, or both.

Some examples of the method, apparatuses, and non-transitory computer-readable medium described herein may further include operations, features, means, or instructions for refraining from transmitting demodulation reference signals during the first slot.

Some examples of the method, apparatuses, and non-transitory computer-readable medium described herein may further include operations, features, means, or instructions for identifying a pattern for a set of demodulation reference signals scheduled to be transmitted during the second slot, applying the pattern to the first slot, where the pattern includes a first subset of demodulation reference signals scheduled to be transmitted in the first slot prior to the selected starting symbol and a second subset of demodulation reference signals scheduled to be transmitted in the first slot subsequent to the selected starting symbol, refraining from transmitting the first subset of demodulation reference signals scheduled for transmission during the first slot, and transmitting the second subset of demodulation reference signals scheduled for transmission during the first slot.

In some examples of the method, apparatuses, and non-transitory computer-readable medium described herein, transmitting the sidelink communication during the first slot based on the rate matched set of data channel resource elements may include operations, features, means, or instructions for puncturing the sidelink communication during a portion of the first slot that occurs before the selected starting symbol.

Some examples of the method, apparatuses, and non-transitory computer-readable medium described herein may further include operations, features, means, or instructions for transmitting, as the sidelink communication and during a set of resources starting from the selected starting symbol, a sidelink control channel transmission and a sidelink shared channel transmission, the sidelink control channel transmission starting from the selected starting symbol and including first sidelink control information.

In some examples of the method, apparatuses, and non-transitory computer-readable medium described herein, the first sidelink control information indicates a pattern of demodulation reference signals and the method, apparatuses, and non-transitory computer-readable medium may include further operations, features, means, or instructions for transmitting the pattern of demodulated reference signals during the set of resources.

In some examples of the method, apparatuses, and non-transitory computer-readable medium described herein, a portion of the pattern may be scheduled to occur outside of the first slot and the method, apparatuses, and non-transitory computer-readable medium may include further operations, features, means, or instructions for refraining from transmitting the portion of the pattern and refraining from transmitting the pattern based on an error condition arising due to the portion of the pattern being scheduled to occur outside of the first slot.

In some examples of the method, apparatuses, and non-transitory computer-readable medium described herein, the sidelink shared channel transmission includes second sidelink control information that may be mapped to a data channel resource element in a symbol that may be adjacent to a demodulation signal.

In some examples of the method, apparatuses, and non-transitory computer-readable medium described herein, rate matching the sidelink shared channel transmission to a set of remaining symbols of the first slot, where the set of remaining symbols of the first slot include symbols of the first slot that occur after the selected starting symbol.

Some examples of the method, apparatuses, and non-transitory computer-readable medium described herein may further include operations, features, means, or instructions for selecting a transport block size for the sidelink shared channel transmission based on a quantity of the remaining symbols in the set of remaining symbols.

In some examples of the method, apparatuses, and non-transitory computer-readable medium described herein, a quantity of starting symbols in the set of multiple starting symbols may be based on a channel decoding hypothesis, a channel success rate, a channel quality metric, or any combination thereof.

A method for wireless communication at a receiving UE is described. The method may include receiving control information indicative of a set of multiple starting symbols in a first slot, the set of multiple starting symbols being within a resource pool for unlicensed sidelink communication, the set of multiple starting symbols including at least one default starting symbol and one or more subsequent starting symbols, each of the set of multiple starting symbols representing a potential starting symbol for monitoring, by the receiving UE, of a sidelink communication and receiving, from a transmitting UE, at least a portion of the sidelink communication during one of the one or more subsequent starting symbols, the one of the one or more subsequent starting symbols representing a beginning of a channel occupancy duration of the transmitting UE.

An apparatus for wireless communication at a receiving UE is described. The apparatus may include a processor, memory coupled with the processor, and instructions stored in the memory. The instructions may be executable by the processor to cause the apparatus to receive control information indicative of a set of multiple starting symbols in a first slot, the set of multiple starting symbols being within a resource pool for unlicensed sidelink communication, the set of multiple starting symbols including at least one default starting symbol and one or more subsequent starting symbols, each of the set of multiple starting symbols representing a potential starting symbol for monitoring, by the receiving UE, of a sidelink communication and receive, from a transmitting UE, at least a portion of the sidelink communication during one of the one or more subsequent starting symbols, the one of the one or more subsequent starting symbols representing a beginning of a channel occupancy duration of the transmitting UE.

Another apparatus for wireless communication at a receiving UE is described. The apparatus may include means for receiving control information indicative of a set of multiple starting symbols in a first slot, the set of multiple starting symbols being within a resource pool for unlicensed sidelink communication, the set of multiple starting symbols including at least one default starting symbol and one or more subsequent starting symbols, each of the set of multiple starting symbols representing a potential starting symbol for monitoring, by the receiving UE, of a sidelink communication and means for receiving, from a transmitting UE, at least a portion of the sidelink communication during one of the one or more subsequent starting symbols, the one of the one or more subsequent starting symbols representing a beginning of a channel occupancy duration of the transmitting UE.

A non-transitory computer-readable medium storing code for wireless communication at a receiving UE is described. The code may include instructions executable by a processor to receive control information indicative of a set of multiple starting symbols in a first slot, the set of multiple starting symbols being within a resource pool for unlicensed sidelink communication, the set of multiple starting symbols including at least one default starting symbol and one or more subsequent starting symbols, each of the set of multiple starting symbols representing a potential starting symbol for monitoring, by the receiving UE, of a sidelink communication and receive, from a transmitting UE, at least a portion of the sidelink communication during one of the one or more subsequent starting symbols, the one of the one or more subsequent starting symbols representing a beginning of a channel occupancy duration of the transmitting UE.

Some examples of the method, apparatuses, and non-transitory computer-readable medium described herein may further include operations, features, means, or instructions for monitoring for the sidelink communication during each of the set of multiple starting symbols.

In some examples of the method, apparatuses, and non-transitory computer-readable medium described herein, the control information further indicates the set of multiple starting symbols in a second slot and the method, apparatuses, and non-transitory computer-readable medium may include further operations, features, means, or instructions for receiving a second sidelink communication during the channel occupancy time, receipt of the second sidelink communication starting during a default starting symbol in a second slot that may be subsequent to the first slot.

Some examples of the method, apparatuses, and non-transitory computer-readable medium described herein may further include operations, features, means, or instructions for transmitting capability information of the receiving UE and receiving scheduling information from the transmitting UE that schedules the receiving UE for the sidelink communication during the one of the one or more subsequent starting symbols based on the capability information of the receiving UE.

In some examples of the method, apparatuses, and non-transitory computer-readable medium described herein, receiving at least the portion of the sidelink communication during the one of the one or more subsequent starting symbols may include operations, features, means, or instructions for receiving the sidelink communication during the first slot as a rate matched transmission that may be rate matched based on a set of data channel resource elements scheduled during a second slot of the channel occupancy duration.

In some examples of the method, apparatuses, and non-transitory computer-readable medium described herein, receiving at least the portion of the sidelink communication during the one of the one or more subsequent starting symbols may include operations, features, means, or instructions for receiving, as the sidelink communication and during a set of resources starting from the one of the one or more subsequent starting symbols, a sidelink control channel transmission and a sidelink shared channel transmission, the sidelink control channel transmission starting from the one of the one or more subsequent starting symbols and including a first sidelink control information.

In some examples of the method, apparatuses, and non-transitory computer-readable medium described herein, the first sidelink control information indicates a pattern of demodulation reference signals and the method, apparatuses, and non-transitory computer-readable medium may include further operations, features, means, or instructions for receiving the pattern of demodulation reference signals during the set of resources.

Some examples of the method, apparatuses, and non-transitory computer-readable medium described herein may further include operations, features, means, or instructions for receiving the sidelink shared channel transmission as a rate matched set of data channel resource elements in a set of remaining symbols of the first slot, where the set of remaining symbols of the first slot includes symbols of the first slot that occur after the one of the one or more subsequent starting symbols.

In some examples of the method, apparatuses, and non-transitory computer-readable medium described herein, receiving at least the portion of the sidelink communication during the one of the one or more subsequent starting symbols may include operations, features, means, or instructions for receiving a transport block whose transport block size for the sidelink shared channel transmission may be based on a quantity of the remaining symbols in the set of remaining symbols.

DETAILED DESCRIPTION

Figure 1:
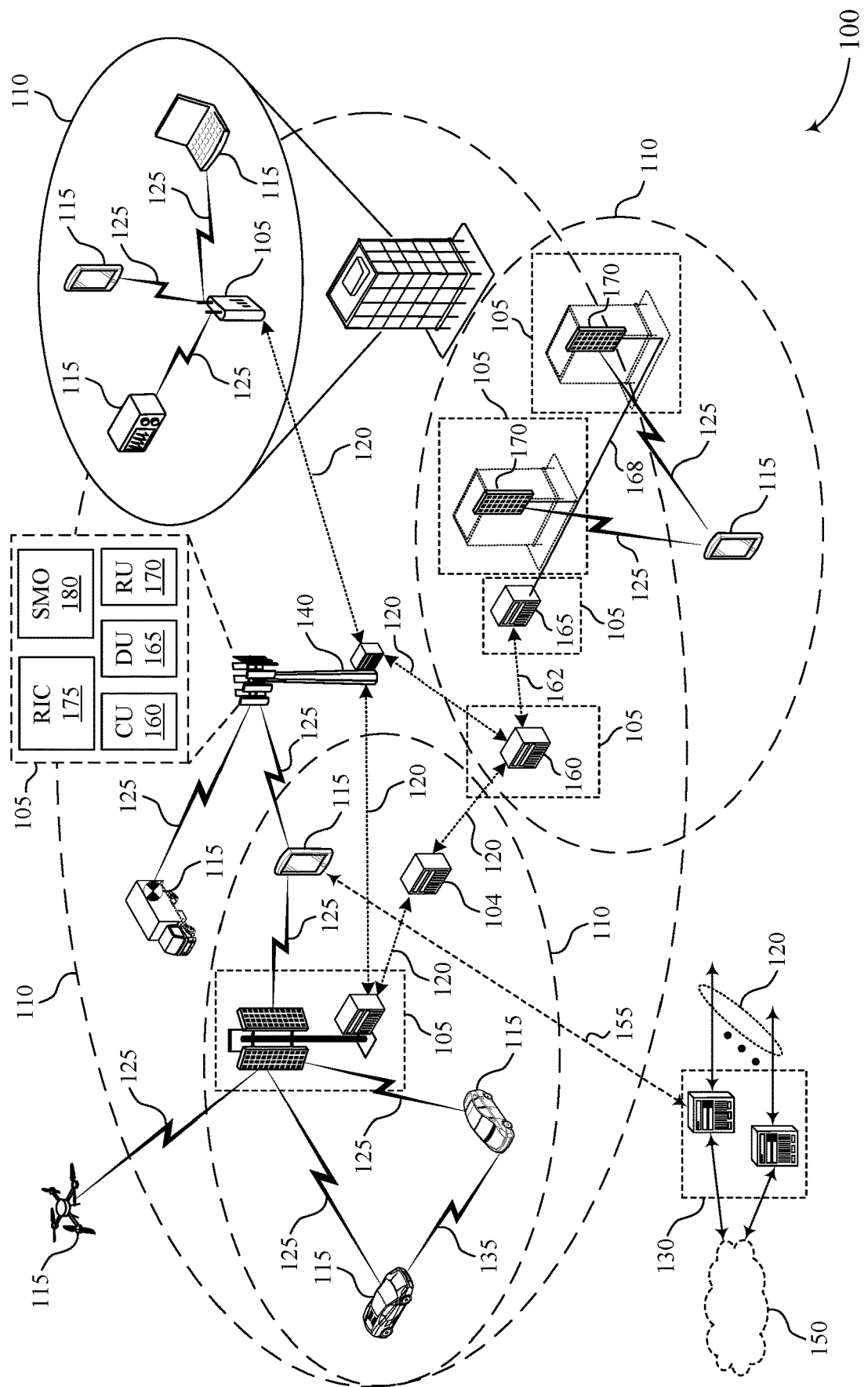
FIG. 1 illustrates an example of a wireless communications system that supports rate matching for unlicensed sidelink channel access in accordance with one or more aspects of the present disclosure.

Some communications systems may support sidelink (SL) communications between devices, such a user equipment (UE) (e.g., device-to-device (D2D) communications, vehicle-to-everything (V2X) communications), in unlicensed frequency bands (SL-U). Unlicensed frequency bands may support communications in multiple radio access technologies (RATs) such as Wi-Fi, 4G, 5G, new radio, 6G, etc. such that devices from different RATs may contend to transmit over the same frequency resources. SL-U communications may be slot-based in which transmissions may be initiated at or near a slot boundary. When UEs communicate via SL-U near or in the presence of devices using different RAT communications, such as Wi-Fi communications, UEs may not have access to sufficient communication resources because devices in other RATs may be permitted to transmit immediately after clearing a listen-before-talk (LBT) procedure regardless of when the procedure is cleared (e.g., the LBT procedure may be cleared in the middle of a slot (e.g., not at a slot boundary) and the Wi-Fi communication is allowed to immediately begin). An SL-U transmitter that clears an LBT procedure may wait until the beginning of a next slot to claim the channel occupancy. Such delays may result in another device (e.g., a Wi-Fi device) occupying the channel.

Solutions to this problem may include implementing a second resource pool having a mini-slot structure and switching between full slot resource pools and mini-slot resource pools to improve channel access. For example, mini-slot structures may improve channel access success rate when UEs compete with asynchronous Wi-Fi devices by enabling transmission to begin using the mini-slot resource pool for channel access and may enable switching to the full slot resource pool based on dynamic control information or slot boundary. In some other examples, mini-slot resource pools and full-slot resource pools may overlap increasing a quantity of available starting symbols where a transmitting UE may select a resource pool for transmission based on which resource pool has a next available boundary (e.g., starting symbol) after clearing an LBT procedure. However, other solutions may further decrease or maintain overhead at a transmitting UE and at a receiving UE and may further decrease complexity at the transmitting UE.

Aspects of the present disclosure relate to a single resource pool solution where, instead of implementing multiple resource pools each corresponding to a possible starting symbol, a single resource pool may include multiple possible starting symbols within a slot. For example, a transmitting UE may receive an indication of a set of starting symbols (e.g., preconfigured starting symbols) each within a slot, and each within a single resource pool. In some examples, the set of starting symbols may include a default starting symbol near or at a slot boundary and may include one or more non-default starting symbols. Based on clearing an LBT procedure (e.g., determining the channel or transmission medium is available (e.g., idle), the transmitting UE may initiate sidelink transmission at a next available starting symbol of the set (e.g., an earliest starting symbol occurring after the LBT procedure). Implementing dynamic starting symbols may enable a transmitting UE to begin sidelink transmission (e.g., physical sidelink control channel (PSCCH) and physical sidelink shared channel (PSSCH) transmission(s)) at a next available starting symbol (e.g., default, non-default) after clearing a LBT and may enable the transmitting UE to default to initiating transmissions during subsequent slots during a default symbol (e.g., during a first occurring starting symbol).

The sidelink transmission may include sidelink control information (SCI) and demodulation reference signals (DMRSs). Alternatively, the sidelink transmission may not include SCI and DMRSs until a subsequent slot after the first slot. In this second case where no SCI is included in the first slot, the SCI may be provided by a later-received SCI and the first slot may be rate matched with transmissions occurring during subsequent slots. For example, noncausal PSSCH rate matching may enable a transmitting UE to rat-match PSSCH from a subsequent slot of a channel occupancy duration or time (COT) when the first slot of the COT is initiated during a non-default starting symbol. In some such examples, the transmitting UE may rate match the PSSCH data resource elements (REs) into the first slot starting with the non-default starting symbol and may puncture the PSSCH in the first slot based on the selected starting symbol after clearing an LBT procedure.

Aspects of the disclosure are initially described in the context of wireless communications systems. Aspects of the disclosure are then described in the context of a starting symbol resource configuration, a resource mapping configuration, a rate matching resource configuration, and a process flow. Aspects of the disclosure are further illustrated by and described with reference to apparatus diagrams, system diagrams, and flowcharts that relate to rate matching for unlicensed sidelink channel access.

FIG. 1 illustrates an example of a wireless communications system 100 that supports rate matching for unlicensed sidelink channel access in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more RATs.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending upon which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support rate matching for unlicensed sidelink channel access as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_S=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different RATs.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) RAT, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In some example, the wireless communications system 100 may support SL-U communications in which UEs 115 and other wireless devices such as Wi-Fi devices may contend for channel access. SL-U communications may be referred to as "slot-based" in which transmissions by UEs communicating in SL-U may initiate a transmission during or near a slot boundary (e.g., symbol 0 or symbol 13 of a 14 symbol slot).

UEs 115 that communication via SL-U may experience starvation issues (e.g., limited access to frequency bandwidth or resources) when operating in the presence of or near Wi-Fi devices that operate using asynchronous channel access because Wi-Fi devices may not be restricted to initiating transmissions during a slot boundary and may transmit in a next available time resource after clearing an LBT procedure. That is, an SL-U transmitting UE 115 that clears an LBT procedure may wait until the beginning of a next slot to claim the channel occupancy and the delay may result in a Wi-Fi device occupying the channel. This type of communications may preclude SL-U transmissions (e.g., block channel access for the transmitting UE) when the transmitting UE clears a corresponding LBT procedure mid-slot (e.g., during one of symbols 1-12 of a 14 symbol slot). Cyclic prefix extensions and automatic gain control (AGC) symbol puncturing may enable multiple starting positions, however, such positions may be centered or based on symbols near the slot boundary and thus provides limited flexibility for dynamic slot starting symbols. Additionally, lone cyclic prefix (CP) extension and padding signals may incur issues with implementation and inter-RAT communications.

Instead, a transmitting UE 115 may receive control information indicative of a plurality of starting symbols in a first slot. In some examples, the plurality of starting symbols may include at least one default starting symbol and one or more subsequent starting symbols. Each starting symbol may representing a potential starting symbol for transmission of a sidelink communication. The transmitting UE 115 may perform an LBT procedure during at least the first slot and based on clearing the LBT procedure may transmit, to a receiving UE 115 at least an initial portion of the sidelink communication during a selected starting symbol of the plurality of starting symbols of the first slot. In some examples, the selected starting symbol may be one of the one or more subsequent starting symbols and may indicate or represent a beginning of a COT.

In some examples, the sidelink communications may include sidelink control information and sidelink data and in some other examples may include rate matched data from a subsequent slot.

Figure 2:
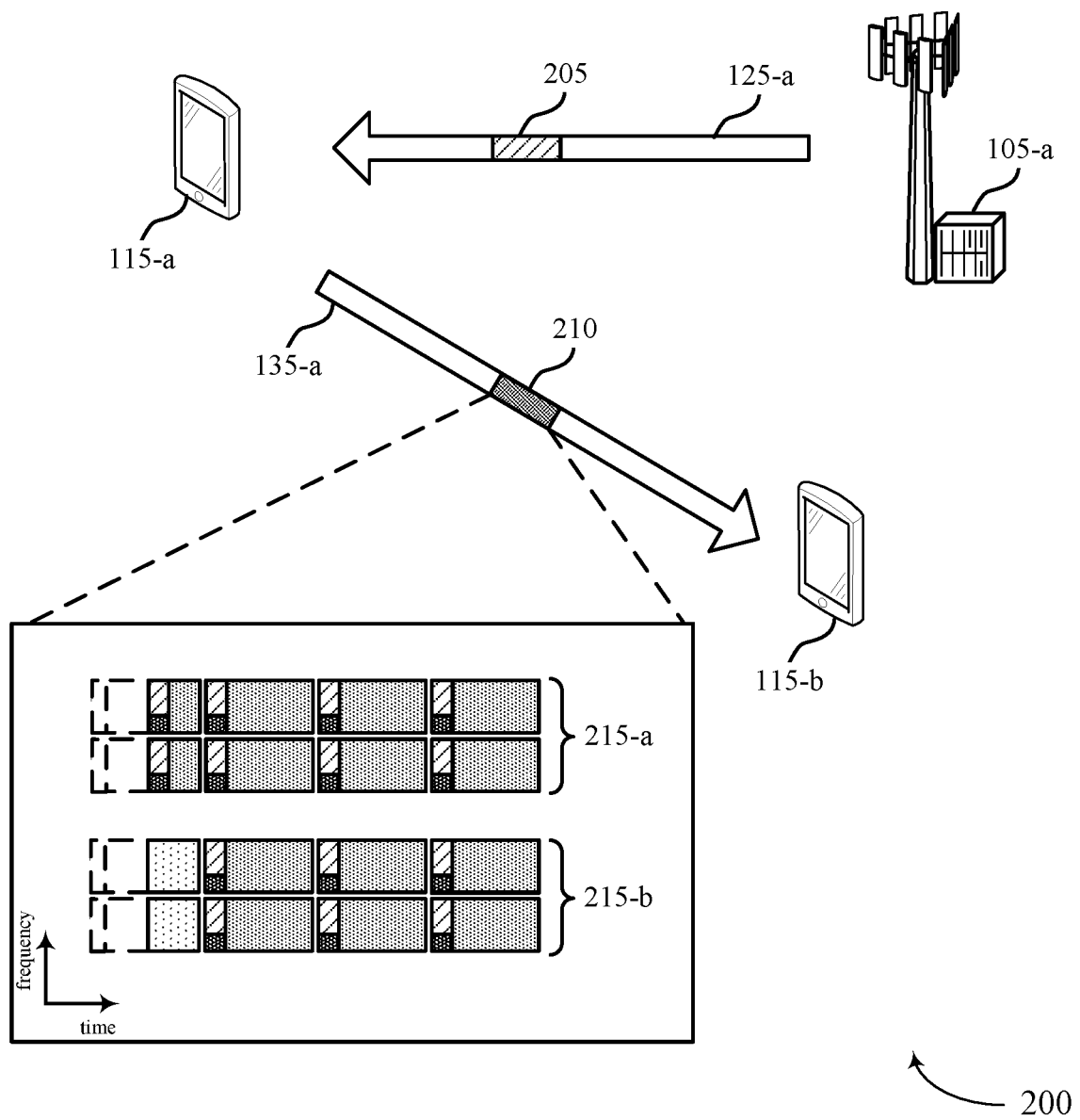
FIG. 2 illustrates an example of a wireless communications system that supports rate matching for unlicensed sidelink channel access in accordance with one or more aspects of the present disclosure.

FIG. 2 illustrates an example of a wireless communications system 200 that supports rate matching for unlicensed sidelink channel access in accordance with one or more aspects of the present disclosure. For example, the wireless communications system 200 may include a network entity 105-*a*, which may be an example of a network entity 105 described with reference to FIG. 1. Likewise, the wireless communications system 200 may include a transmitting UE 115-*a* and a receiving UE 115-*b*, which may be examples of a UE 115 described with reference to FIG. 1.

The wireless communications system 200 may support SL-U communications between the transmitting UE 115-*a* and the receiving UE 115-*b* (e.g., via D2D communications, V2X communications) in which the transmitting UE 115-*a* may attempt to claim the same frequency resources as other devices, e.g., communicating via different RATs such as Wi-Fi. In some other wireless communications systems, SL-U communications may be slot-based in which transmissions may be initiated at or near a slot boundary. In some such examples, when a UE communicates via SL-U near or in the presence of Wi-Fi, access to sufficient communication resources may be limited because the Wi-Fi devices may be permitted to transmit immediately after clearing an LBT procedure regardless of when the procedure is cleared (e.g., the LBT procedure may be cleared in the middle of a slot (e.g., not at a slot boundary) and the Wi-Fi communication may be allowed to immediately begin). An SL-U transmitter that clears an LBT procedure in such wireless communications systems may wait until the beginning of a next slot to claim the channel occupancy. Such delays may result in another device (e.g., a Wi-Fi device) occupying the channel.

However, the wireless communications system 200 may support a solution in which a resource pool may include multiple possible starting symbols within a slot. For example, the transmitting UE 115-*a* may receive, from the network entity 105-*a* via access link 125-*a*, control signaling indicating or including an indication 205 of a set of starting symbols (e.g., for initiating a COT 215) which may be preconfigured or may be dynamically configured (e.g., via RRC signaling, DCI) by the network entity 105-*a*. The set of starting symbols may each represent a potential starting symbol for sidelink transmission by the transmitting UE 115-*a* within a first slot of the COT 215 (e.g., COT 215-*a* or 215-*b*). In some examples, the set of starting symbols may include a default starting symbol (e.g., near or at a slot boundary) and may include one or more non-default starting symbols. The transmitting UE 115-*a* may determine to transmit sidelink transmission 210 to the receiving UE 115-*b* and may perform an LBT procedure to determine whether communication resources (e.g., bandwidth, channel, sidelink 135-*a*) are available or clear for transmission. Based on determining that communication resources for the sidelink 135-*a* are available, the transmitting UE 115-*a* may initiate sidelink transmission 210 at a next available starting symbol of the set (e.g., during an earliest starting symbol of the set occurring after the LBT procedure). Implementing dynamic starting symbols may enable the transmitting UE 115-*a* to initiate sidelink transmission 210 at a next available starting symbol (e.g., default, non-default) after clearing a LBT to avoid a lengthy delay caused by waiting for a next default starting symbol. In some examples, after initiating the sidelink transmission 210 during a starting symbol of a first slot of the COT 215-*a* or 215-*b*, the transmitting UE 115-*a* may default to initiating subsequent slots of the COT 215-*a* or COT 215-*b* during a default symbol (e.g., during a first occurring starting symbol of subsequent slots).

For example, in the COT 215-*a*, the sidelink transmission in the first slot may include control information (e.g., PSCCH including, for example, SCI or DMRSs), or both. Alternatively, in the example of COT 215-*b*, the sidelink transmission may not include control information (e.g., may not include PSCCH and thus may not include SCI or DMRSs) until a subsequent slot after the first slot. In the COT 215-*b*, the control information may be provided in a subsequent slot and the first slot may be rate matched with data (e.g., PSSCH) occurring during subsequent slots. For example, the transmitting UE 115-*a* may perform noncausal PSSCH rate matching which may enable the transmitting UE 115-*a* to rate match PSSCH from a subsequent slot of the COT 215-*b* when the first slot of the COT 215-*b* is initiated during a non-default starting symbol. In some such examples, the transmitting UE 115-*a* may rate match PSSCH data REs into the first slot starting with the non-default starting symbol or may puncture the PSSCH in the first slot based on the selected starting symbol after clearing an LBT procedure, or both.

Figure 3A:
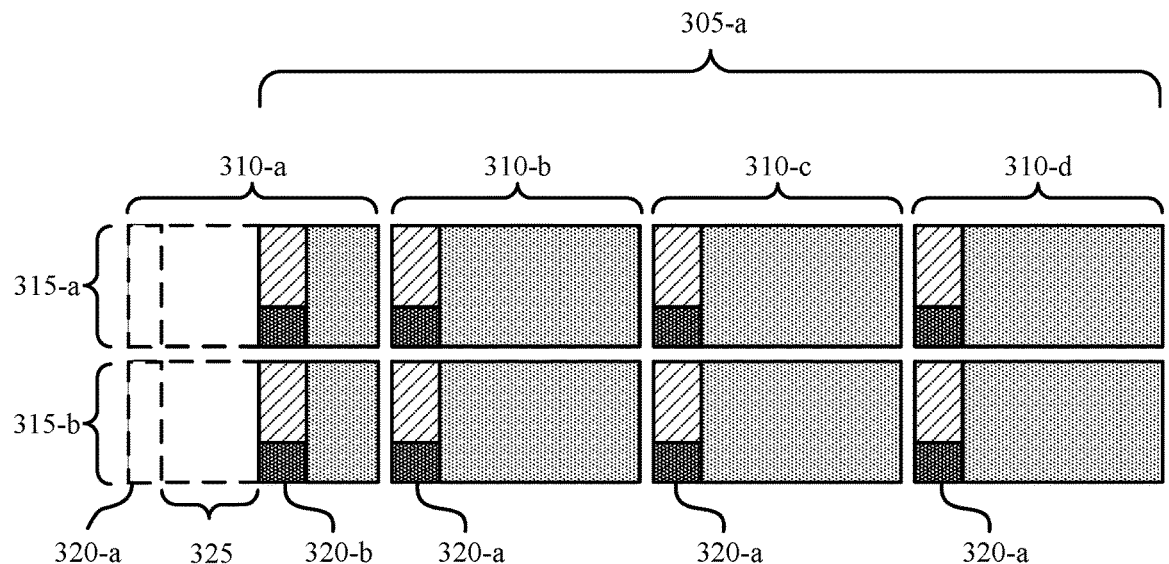
FIGS. 3A & 3B illustrate examples of a starting symbol resource configuration that support rate matching for unlicensed sidelink channel access in accordance with one or more aspects of the present disclosure.
Figure 3B:
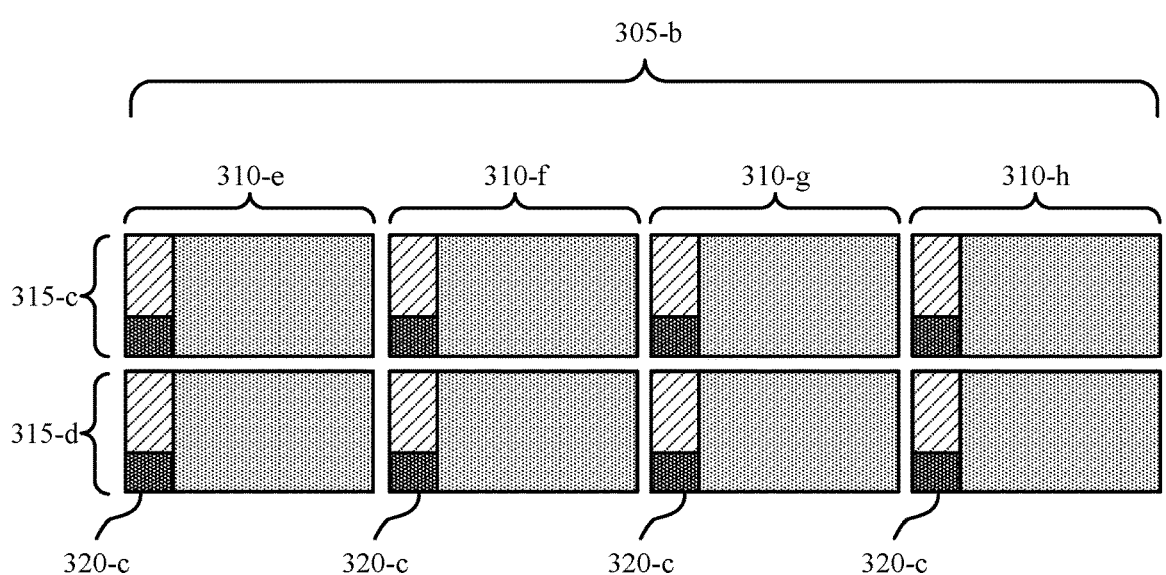

FIGS. 3A and 3B each illustrate an example of a starting symbol resource configuration 301 or 302, respectively that each support rate matching for unlicensed sidelink channel access in accordance with one or more aspects of the present disclosure. The starting symbol resource configurations 301 and 302 may each include a COT 305, slots 310, subchannels 315-*a* and 315-*b*, starting symbols 320, and symbols 325. The starting symbol resource configurations 301 and 302 may each implement aspects of wireless communications system 100, wireless communications system 200, or both.

In the examples of FIGS. 3A and 3B, a starting symbol 320 of a slot 310 may be RRC configured (e.g., statically or semi-statically configured), however, dynamic starting symbols 320 may introduce more flexibility into SL-U communications systems among other advantages. For example, a UE 115 as described with reference to FIGS. 1 and 2, may be configured with or enabled to utilize a set of starting symbols 320 within each slot 310 and may initiate sidelink transmissions (e.g., PSCCH including SCI, DMRSs or the like, PSSCH) during a next occurring starting symbol 320 after clearing an LBT procedure and may initiate sidelink transmissions (e.g., PSCCH, PSSCH) in subsequent slots 310 during a default starting symbol 320.

The set of starting symbols 320 may be preconfigured and may include a quantity of starting symbols based on a quantity of decoding hypothesis for the PSCCH/PSSCH and a channel access success rate. For example, a slot 310 may include 14 symbols and the set of starting symbols 320 may include at least one default starting symbol and at least one non-default starting symbol 320.

In the example of FIG. 3A, the set of starting symbols 320 may include default starting symbol 320-*a* and non-default starting symbol 320-*b*. In this example, the transmitting UE 115 may clear a LBT procedure during symbols 325, and the transmitting UE 115 may initiate the COT 305-*a* for sidelink transmissions (e.g., PSCCH including SCI, DMRSs, or PSSCH, or both) during non-default starting symbol 320-*b* in slot 310-*a* and may transmit sidelink communications in subsequent slots 310-*b*, 310-*c*, and 310-*d* of the COT 305-*a* during respective default starting symbols 320-*a*. That is, in the first slot 310-*a*, sidelink communications (e.g., PSCCH/PSSCH) may be initiated during non-default starting symbol 320-*b* and in subsequent slots 310-*b*, 310-*c*, and 310-*d*, sidelink communications (e.g., PSCCH/PSSCH) may be initiated during respective default starting slots 320-*a*.

In the example of FIG. 3B, the set of starting symbols 320 may include default starting symbol 320-*c* and one or more unspecified non-default starting symbol 320. In this example, the transmitting UE 115 may clear a LBT procedure before starting symbol 320-*c* of slot 310-*e* and after a last occurring non-default starting symbol of a previously occurring slot 310. The transmitting UE 115 may initiate the COT 305-*b* for sidelink transmissions (e.g., PSCCH including SCI, DMRSs, or PSSCH, or both) during default starting symbol 320-*c* in slot 310-*e* and may transmit sidelink communications in subsequent slots 310-*f*, 310-*g*, and 310-*h* of the COT 305-*b* during respective default starting symbols 320-*c*. That is, in the first slot 310-*e*, sidelink communications (e.g., PSCCH/PSSCH) may be initiated during slot 310-*e* and in subsequent slots 310-*f*, 310-*g*, and 310-*h*, sidelink communications (e.g., PSCCH/PSSCH) may be initiated during respective default starting symbols 320-*c*.

Figure 4:
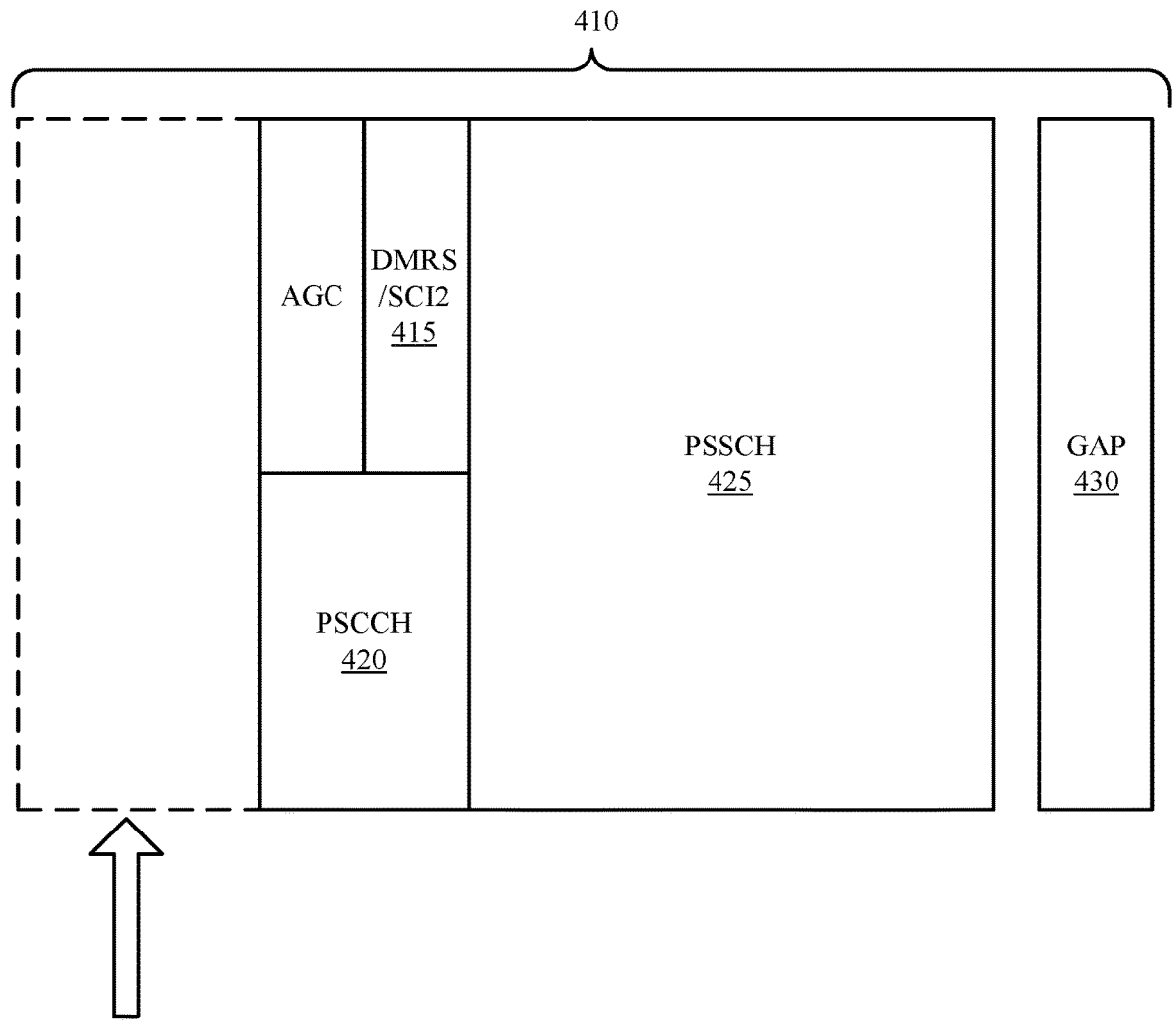
FIG. 4 illustrates an example of a resource mapping configuration that supports rate matching for unlicensed sidelink channel access in accordance with one or more aspects of the present disclosure.

FIG. 4 illustrates an example of a resource mapping configuration 400 that supports rate matching for unlicensed sidelink channel access in accordance with one or more aspects of the present disclosure. The resource mapping configuration 400 may include a slot 410, DMRSs/SCI2 415, PSCCH 420, PSSCH 425 and Gap 430. The resource mapping configuration 400 may implement aspects of wireless communications system 100, wireless communications system 200, or both.

In some such examples, because PSCCH 420 may be initially transmitted during any of a set of indicated starting symbols, there may be a motivation for mechanisms for resource mapping of the PSCCH 420, in some cases. For example, a transmitting UE 115 (e.g., which may be an example of a transmitting UE 115 described with reference to FIG. 1 or FIG. 2, or both) may be configured or may be enabled such that PSCCH 420 is mapped to resources of the slot 410 beginning with a selected starting symbol of the set of indicated starting symbols (e.g., occurring after the LBT procedure clears). In some such examples, DMRSs (e.g., PSCCH 420 DMRSs) and SCI-1 REs of the PSCCH 420 may be mapped to resources of the slot 410 starting with the selected starting symbol. As such, when a receiving UE 115 (e.g., which may be an example of a transmitting UE 115 described with reference to FIG. 1 or FIG. 2, or both) determines to decode the PSSCH 425 beginning with the non-default starting symbol of the set, the receiving UE 115 may be motivated to monitor for PSCCH 420 during each starting symbol of the set of starting symbols.

A receiving UE 115 may monitor the set of starting symbol according to a capability of the receiving UE 115. For example, a relatively high capability receiving UE 115 may monitor for PSCCH 420 transmitted in a plurality of different starting symbols within the slot 410 and a relatively low capability receiving UE 115 may monitor the PSCCH 420 transmitted in a default starting symbol. As such, the transmitting UE 115 may schedule a relatively high capability receiving UE 115 during the beginning or earlier slots of a COT such that PSCCH 420 and PSSCH 425 may be successfully decoded if transmission begins with a non-default starting symbol of slot 410 due to timing of the LBT procedure.

In some examples, the transmitting UE 115 may map DMRSs 415 (e.g., PSSCH 425 DMRSs) relative to a selected starting symbol. The transmitting UE 115 may transmit SCI-1 via PSCCH 420 indicating a DMRS pattern that is mapped relative to the selected starting symbol, however, based on the selected starting symbol, not all possible DMRS patterns may be valid. For example, when SCI-1 of PSCCH 420 indicates a DMRS pattern in which some DMRS occasions would occur outside of the boundary of slot 410 (e.g., after the last symbol of the slot 410 due to selecting a non-default starting symbol), the DMRS occasions occurring outside of the slot boundary may be omitted or skipped. That is, when a DMRS pattern spans a set of time resources that is larger than a remaining set of time resources after the selected starting symbol of slot 410, the DMRS occasions scheduled to occur after the end boundary of slot 410 may be omitted or skipped In some examples, the transmitting UE 115 may map SCI-2 415 to resources (e.g., PSSCH 425 REs) around (e.g., outside of) the symbol in which a first DMRS occasion occurs. The transmitting UE 115 may rate match PSSCH 425 data REs to remaining symbols after the chosen starting symbol. The transmitting UE 115 may additionally or alternatively may select a transport block size for PSSCH 425 such that the transport block may fit into the remaining symbols of slot 410 based on the selected starting symbol. If the transmission occurs at an earlier starting symbol of the set, rate matching to more REs may increase redundancy.

Figure 5:
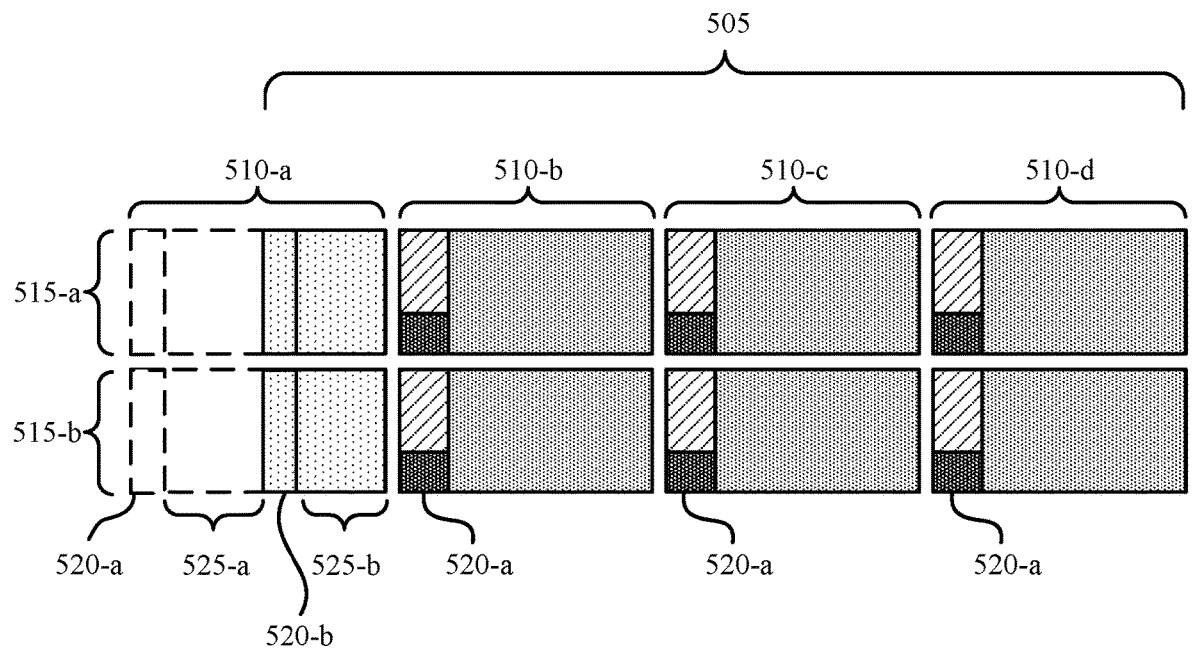
FIG. 5 illustrates an example of a rate matching resource configuration that supports rate matching for unlicensed sidelink channel access in accordance with one or more aspects of the present disclosure.

FIG. 5 illustrates an example of a rate matching resource configuration 500 that supports rate matching for unlicensed sidelink channel access in accordance with one or more aspects of the present disclosure. The rate matching resource configuration 500 may include a COT 505, slots 510, subchannels 515-*a* and 515-*b*, starting symbols 520, and symbols 525. The rate matching resource configuration 500 may implement aspects of wireless communications system 100, wireless communications system 200, or both.

In some examples, for communications to be successful when dynamically initiating COT 505 by transmitting control information (e.g., PSCCH, SCI1, SCI2, DMRSs) during one of the plurality of starting symbols, a receiving UE 115 (which may be an example of a receiving UE 115 as described with reference to FIG. 1 or FIG. 2, or both) may monitor for the control information during each of the plurality of starting symbols 520 within a slot. This may increase complexity at the receiving UE 115 beyond a capability in some examples.

As such, a transmitting UE may include data in a first slot of the COT (e.g., a partial first slot) but may not include control information.

For example, the transmitting UE (which may be an example of a transmitting UE 115 as described with reference to FIG. 1 or FIG. 2, or both) may rate match PSSCH from subsequent slot 510-*b* (or, for example, from one or more of slots 510-*b*, 510-*c*, and 510-*d*) of the COT 505 when a first slot 510-*a* of the COT 505 is initiated during a non-default starting symbol 520-*b* of a set of indicated starting symbols 520 (e.g., which may be preconfigured starting symbols). When a LBT procedure performed by the transmitting UE 115 is cleared (e.g., the transmitting UE 115 is clear to transmit without overlapping or impacting other communications) after the default starting symbol 520-*a* and before a last occurring starting symbol 520-*b*, the transmitting UE 115 may rate match PSSCH from subsequent slot 510-*b* to the first slot 510-*a* beginning in the next occurring starting symbol 520-*b* after the LBT procedure is cleared.

For example, the plurality of starting symbols 520 may include symbols 520-*a* and 520-*b*, and the transmitting UE 115 may clear a LBT procedure during symbols 525-*a*. In such examples, the transmitting UE 115 may rate match PSSCH from slot 510-*b* into slot 510-*a* first slot beginning with starting symbol 520-*b* and in symbols 525.

In some examples, the transmitting UE may indicate via noncausal SCI-1 or SCI-2 or both in one or more of slots 510-*b*, 510-*c*, or 510-*d*, that PSSCH rate matching is performed in the preceding (e.g., prior) slot 510-*a*. In some such examples, SCI (e.g., SCI 1 or SCI 2 or both) may indicate the selected starting symbol (e.g., non-default starting symbol 520-*b*) in the preceding (e.g., prior) slot 510-*a* for rate matching. In some examples, SCI or SCI 2 or both in one or more of slots 510-*b*, 510-*c*, or 510-*d* may include an additional field to indicate noncausal rate matching is performed in slot 510-*a*. In some examples, a receiving UE 115 having relatively high capabilities may take advantage of the PSSCH REs in the preceding (e.g., prior) slot 510-*a* for more robust PSSCH decoding.

When the transmitting UE 115 rate matches PSSCH from a subsequent slot 510-*b*, 510-*c*, or 510-*d* to the first slot 510-*a* of the COT 505, the PSSCH in the first slot 510-*a* may omit (e.g., not include) DMRSs. This may increase redundant PSSCH REs transmitted to the receiving UE 115 having relatively high capabilities. In some examples (e.g., eMBB communications systems with relatively low mobility), omitting DMRSs from slot 510-*a* may decrease complexity as the lack of DMRSs may not negatively impact the channel estimation timeline and the receiving UE 115 may use DMRSs occurring in any subsequent slots 510-*b*, 510-*c*, or 510-*d*.

Additionally, or alternatively, when the transmitting UE 115 rate matches PSSCH from a subsequent slot 510-*b*, 510-*c*, or 510-*d* to the first slot 510-*a* of the COT 505, the transmitting UE 115 may copy the DMRS pattern from one or slots 510-*b*, 510-*c*, or 510-*d* to the first slot 510-*a* and may drop or omit DMRS(s) occurring before the non-default starting symbol 520-*b*.

Rate matching PSSCH from a subsequent slot 510-*b*, 510-*c*, or 510-*d* to the first slot 510-*a* of the COT 505 by the transmitting UE 115 may impact a transmission timeline for the transmitting UE 115 because rate matching may be a function of the selected starting symbol 520, however the transmitting UE 115 may determine to rate match PSSCH from a subsequent slot 510-*b*, 510-*c*, or 510-*d* to the first slot 510-*a* of the COT 505 regardless of the selected starting symbol 520. For example, the transmitting UE 115 may rate match PSSCH from a subsequent slot t510-*b*, 510-*c*, or 510-*d* to the first slot 510-*a* of the COT 505 and may puncture the PSSCH REs based on the selected starting symbol 520. For example, the transmitting UE 115 may rate match the PSSCH data REs to the first slot 510-*a* starting with the first non-default starting symbol 520-*b* and may puncture the PSSCH in the first slot 510-*a* based on the selected starting symbol (e.g., a selected starting symbol occurring after non-default starting symbol 520-*b*) after clearing the LBT procedure. In some such examples, SCI (e.g., SCI 1, SCI 2) received in one or more of slots 510-*b*, 510-*c*, or 510-*d* may indicate to the receiving UE 115 the selected starting symbol 520-*b* or may indicate that the selected starting symbol 520-*b* is punctured, or both.

Figure 6:
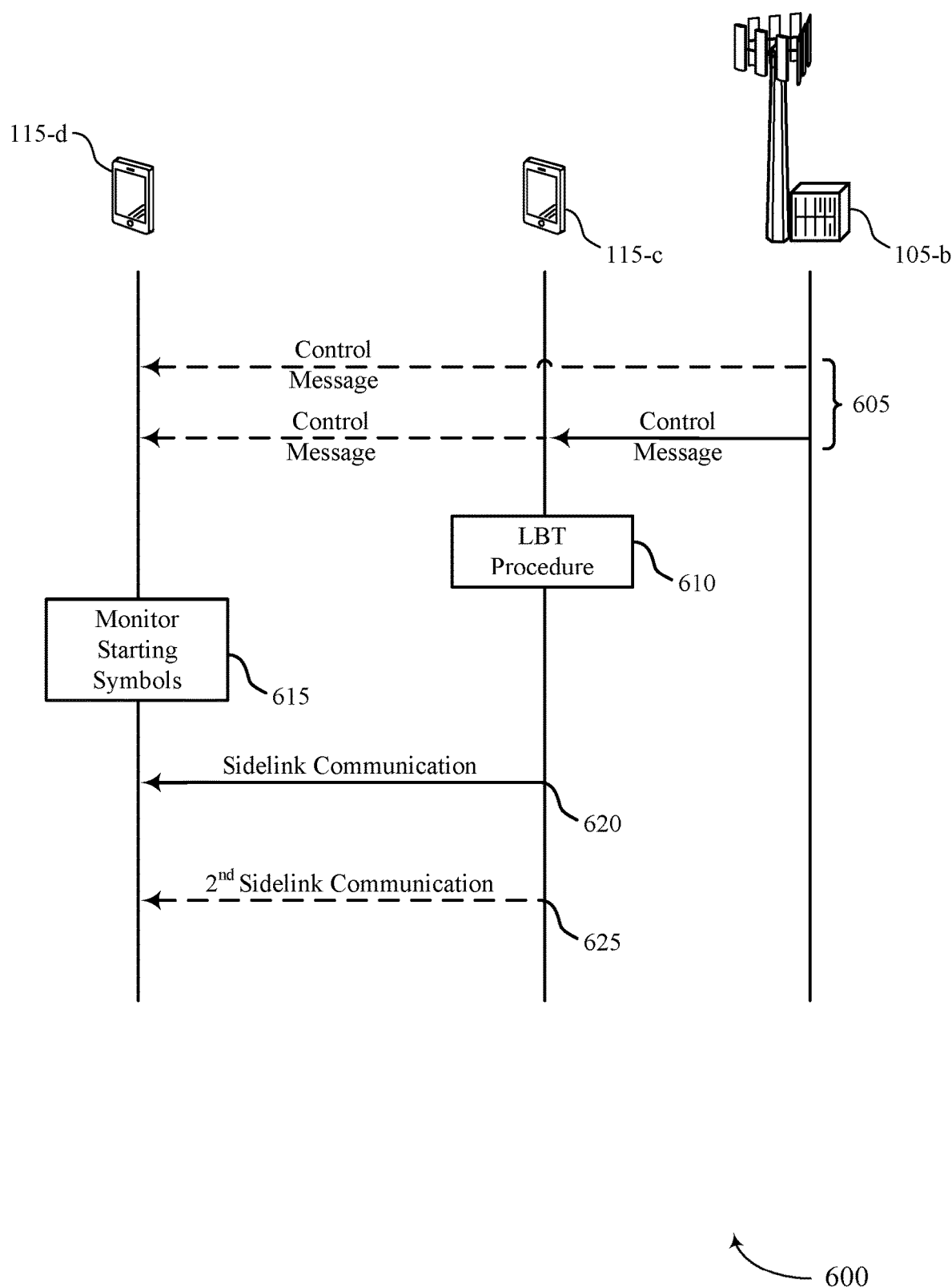
FIG. 6 illustrates an example of a process flow that supports rate matching for unlicensed sidelink channel access in accordance with one or more aspects of the present disclosure.

FIG. 6 illustrates an example of a process flow 600 that supports rate matching for unlicensed sidelink channel access in accordance with one or more aspects of the present disclosure. For example, the process flow 600 may include a network entity 105-*b*, which may be an example of corresponding network entities 105 described with reference to FIGS. 1 and 2. Likewise, the process flow 600 may include a UE 115-*c* and a UE 115-*d* which may be examples of corresponding UEs 115 described with reference to FIGS. 1 through 5.

At 605, the UE 115-*c*, the UE 115-*d*, or both may receive control information indicating a set or plurality of starting symbols in a first slot. The set of starting symbols may be within a single resource pool for SL-U communications and the set of starting symbols may include at least one default starting symbol and one or more subsequent starting symbols (e.g., non-default starting symbols). A quantity of starting symbols in the plurality of starting symbols may be based on a channel decoding hypothesis, a channel success rate, a channel quality metric, or any combination thereof. In some examples, each of the plurality of starting symbols may represent a potential starting symbol for transmission, by the UE 115-*c*, of a sidelink communication after the UE 115-*c* participates in an LBT procedure. In some examples, the UE 115-*d* may receive the control message from the network entity 105-*b* or the UE 115-*c* may forward the control message to the UE 115-*d*. In some examples, the UE 115-*c* may schedule the UE 115-*d* to receive the sidelink communication during the first slot and after the LBT procedure based on a capability of the UE 115-*d*.

At 610, the UE 115-*c* may perform the LBT procedure during or before the first slot.

At 615, the UE 115-*d* may monitor for the sidelink communication during one or more of the plurality of starting symbols.

At 620, the UE 115-*c* may transmit, to the UE 115-*d* and based on performance of the LBT procedure during or before at least the first slot, at least an initial portion of the sidelink communication (e.g., including PSCCH or PSSCH or both) during a selected starting symbol of the plurality of starting symbols, the selected starting symbol being one of the one or more subsequent starting symbols and representing a beginning of a COT of the UE 115-*c*.

In some examples, the UE 115-*c* may transmit at least the initial portion during a next available starting symbol of the plurality of starting symbols after the performance of the LBT procedure. In such examples, the next available starting symbol may be the selected starting symbol.

In some examples, the UE 115-*c* may rate match transmission of the sidelink communication during the first slot based on a set of data channel resource elements scheduled during a second slot of the COT and may transmitting the sidelink communication during the first slot based on the rate matched set of data channel resource elements. In some examples, transmitting the sidelink communication during the first slot based on the rate matched set of data channel resource elements includes refraining from transmitting SCI during the selected starting symbol of the first slot, and in some cases, transmitting the SCI during the second slot. The SCI may include an indication that rate matching occurred in the first slot, an indication of the selected starting symbol in the first slot, or both.

In some examples, the UE 115-c may refrain from transmitting DMRSs during the first slot or may identify a pattern for a set of DMRSs scheduled to be transmitted during the second slot and may apply the pattern to the first slot. The pattern may include a first subset of DMRSs scheduled to be transmitted in the first slot prior to the selected starting symbol and a second subset of DMRSs scheduled to be transmitted in the first slot subsequent to the selected starting symbol. In some such examples, the UE 115-c may refrain from transmitting the first subset of demodulation reference signals scheduled for transmission during the first slot and may transmitting the second subset of demodulation reference signals scheduled for transmission during the first slot.

In some examples, the UE 115-c may puncture the sidelink communication during a portion of the first slot that occurs before the selected starting symbol.

The UE 115-c may, in some cases, transmit, as the sidelink communication and during a set of resources starting from the selected starting symbol, a sidelink control channel transmission and a sidelink shared channel transmission, the sidelink control channel transmission starting from the selected starting symbol and including first sidelink control information. In some examples, the first sidelink control information may indicates a pattern of DMRSs and the UE 115-c may transmit the pattern of demodulated reference signals during the set of resources. In some other examples, the first sidelink control information may indicates a pattern of DMRSs and a portion of the pattern may be scheduled to occur outside of the first slot. In some such examples, the UE 115-c may refrain from transmitting the portion of the pattern or may refrain from transmitting the pattern based on an error condition arising due to the portion of the pattern being scheduled to occur outside of the first slot (e.g., the DMRSs pattern may be identified as invalid).

In some examples, the sidelink shared channel transmission includes second sidelink control information that is mapped to a data channel resource element in a symbol that is adjacent to a demodulation signal. The UE 115-c may, in some examples, rate matching the sidelink shared channel transmission to a set of remaining symbols of the first slot. The set of remaining symbols of the first slot may include symbols of the first slot that occur after the selected starting symbol. The UE 115-c may select a transport block size for the sidelink shared channel transmission based on a quantity of the remaining symbols in the set of remaining symbols.

Figure 7:
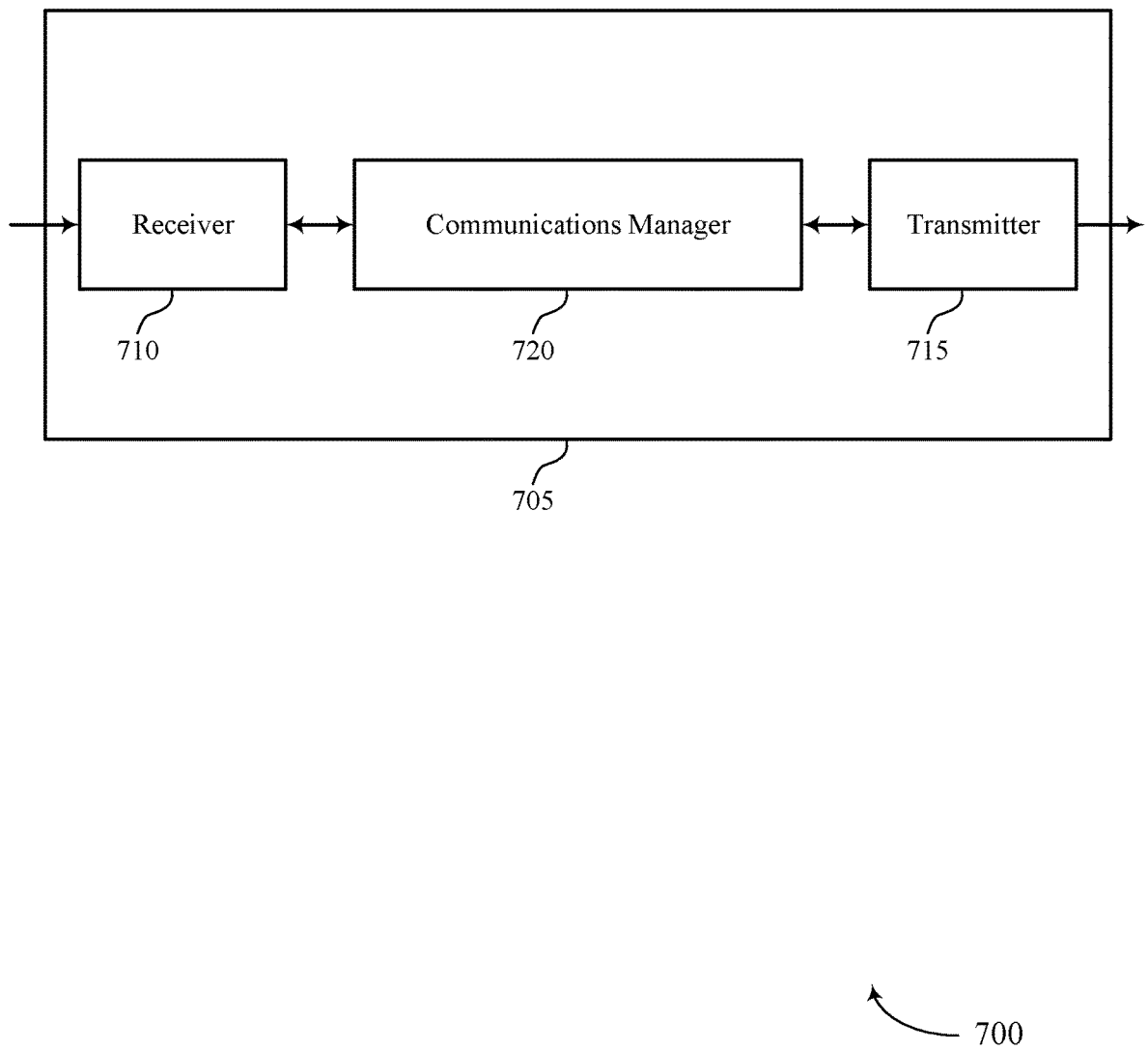
FIGS. 7 and 8 show block diagrams of devices that support rate matching for unlicensed sidelink channel access in accordance with one or more aspects of the present disclosure.

At 625, in some examples, the UE 115-c may transmit a second sidelink communication during the channel occupancy duration, transmission of the second sidelink communication starting during a default starting symbol of a second slot that is subsequent to the first slot FIG. 7 shows a block diagram 700 of a device 705 that supports rate matching for unlicensed sidelink channel access in accordance with one or more aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to rate matching for unlicensed sidelink channel access). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to rate matching for unlicensed sidelink channel access). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of rate matching for unlicensed sidelink channel access as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 720 may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communication at a transmitting UE in accordance with examples as disclosed herein. For example, the communications manager 720 may be configured as or otherwise support a means for receiving control information indicative of a set of multiple starting symbols in a first slot, the set of multiple starting symbols being within a resource pool for unlicensed sidelink communication, the set of multiple starting symbols including at least one default starting symbol and one or more subsequent starting symbols, each of the set of multiple starting symbols representing a potential starting symbol for transmission, by the transmitting UE, of a sidelink communication after the transmitting UE participates in a listen-before-talk procedure. The communications manager 720 may be configured as or otherwise support a means for performing the listen-before-talk procedure during at least the first slot. The communications manager 720 may be configured as or otherwise support a means for transmitting, to a receiving UE and based on performance of the listen-before-talk procedure during at least the first slot, at least an initial portion of the sidelink communication during a selected starting symbol of the set of multiple starting symbols, the selected starting symbol being one of the one or more subsequent starting symbols and representing a beginning of a channel occupancy duration of the transmitting UE.

Additionally, or alternatively, the communications manager 720 may support wireless communication at a receiving UE in accordance with examples as disclosed herein. For example, the communications manager 720 may be configured as or otherwise support a means for receiving control information indicative of a set of multiple starting symbols in a first slot, the set of multiple starting symbols being within a resource pool for unlicensed sidelink communication, the set of multiple starting symbols including at least one default starting symbol and one or more subsequent starting symbols, each of the set of multiple starting symbols representing a potential starting symbol for monitoring, by the receiving UE, of a sidelink communication. The communications manager 720 may be configured as or otherwise support a means for receiving, from a transmitting UE, at least a portion of the sidelink communication during one of the one or more subsequent starting symbols, the one of the one or more subsequent starting symbols representing a beginning of a channel occupancy duration of the transmitting UE.

By including or configuring the communications manager 720 in accordance with examples as described herein, the device 705 (e.g., a processor controlling or otherwise coupled with the receiver 710, the transmitter 715, the communications manager 720, or a combination thereof) may support techniques for more efficient utilization of communication resources, among other examples.

Figure 8:
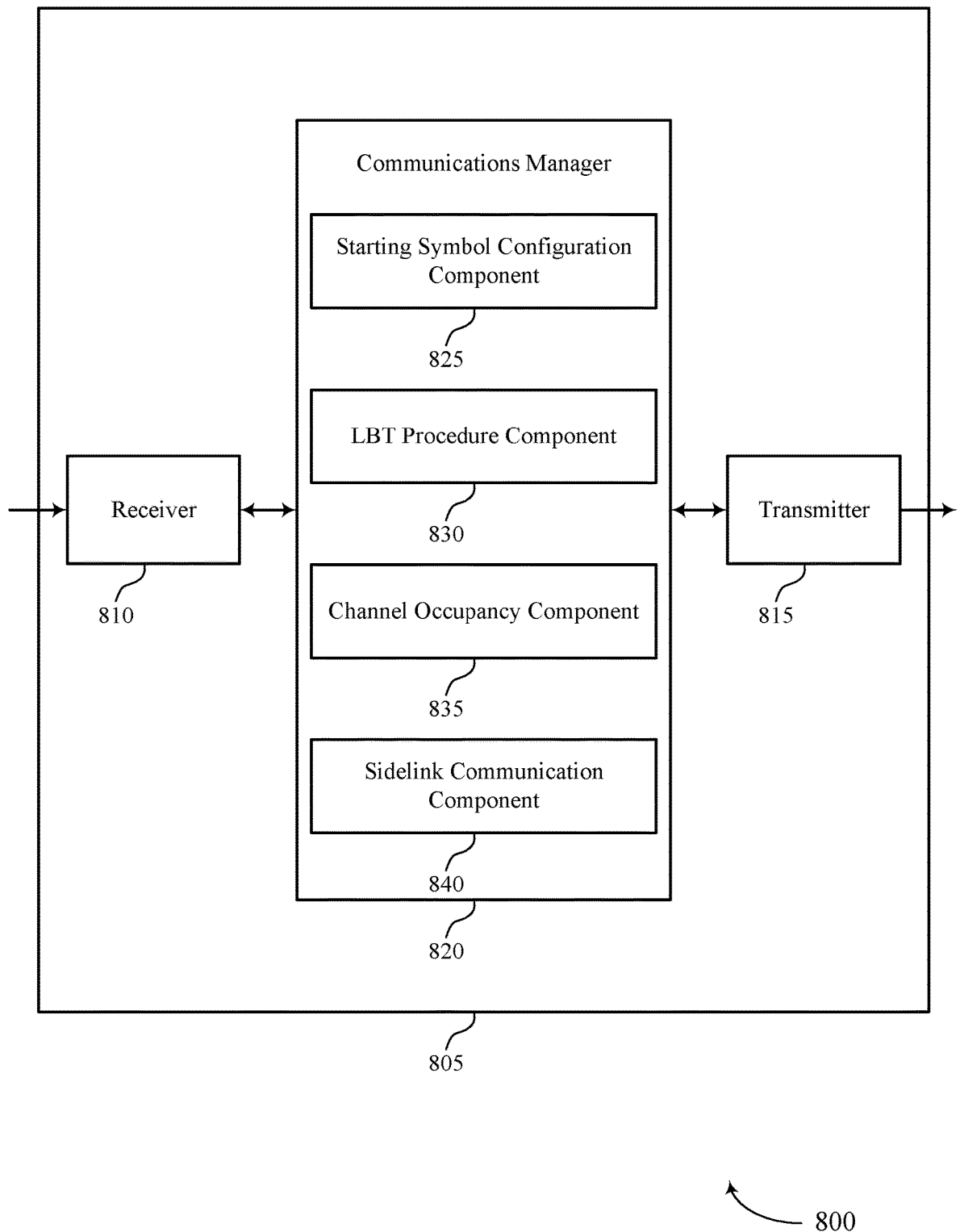

FIG. 8 shows a block diagram 800 of a device 805 that supports rate matching for unlicensed sidelink channel access in accordance with one or more aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to rate matching for unlicensed sidelink channel access). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to rate matching for unlicensed sidelink channel access). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of rate matching for unlicensed sidelink channel access as described herein. For example, the communications manager 820 may include a starting symbol configuration component 825, an LBT procedure component 830, a channel occupancy component 835, a sidelink communication component 840, or any combination thereof. The communications manager 820 may be an example of aspects of a communications manager 720 as described herein. In some examples, the communications manager 820, or various components thereof, may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communication at a transmitting UE in accordance with examples as disclosed herein. The starting symbol configuration component 825 may be configured as or otherwise support a means for receiving control information indicative of a set of multiple starting symbols in a first slot, the set of multiple starting symbols being within a resource pool for unlicensed sidelink communication, the set of multiple starting symbols including at least one default starting symbol and one or more subsequent starting symbols, each of the set of multiple starting symbols representing a potential starting symbol for transmission, by the transmitting UE, of a sidelink communication after the transmitting UE participates in a listen-before-talk procedure. The LBT procedure component 830 may be configured as or otherwise support a means for performing the listen-before-talk procedure during at least the first slot. The channel occupancy component 835 may be configured as or otherwise support a means for transmitting, to a receiving UE and based on performance of the listen-before-talk procedure during at least the first slot, at least an initial portion of the sidelink communication during a selected starting symbol of the set of multiple starting symbols, the selected starting symbol being one of the one or more subsequent starting symbols and representing a beginning of a channel occupancy duration of the transmitting UE.

Additionally, or alternatively, the communications manager 820 may support wireless communication at a receiving UE in accordance with examples as disclosed herein. The starting symbol configuration component 825 may be configured as or otherwise support a means for receiving control information indicative of a set of multiple starting symbols in a first slot, the set of multiple starting symbols being within a resource pool for unlicensed sidelink communication, the set of multiple starting symbols including at least one default starting symbol and one or more subsequent starting symbols, each of the set of multiple starting symbols representing a potential starting symbol for monitoring, by the receiving UE, of a sidelink communication. The sidelink communication component 840 may be configured as or otherwise support a means for receiving, from a transmitting UE, at least a portion of the sidelink communication during one of the one or more subsequent starting symbols, the one of the one or more subsequent starting symbols representing a beginning of a channel occupancy duration of the transmitting UE.

Figure 9:
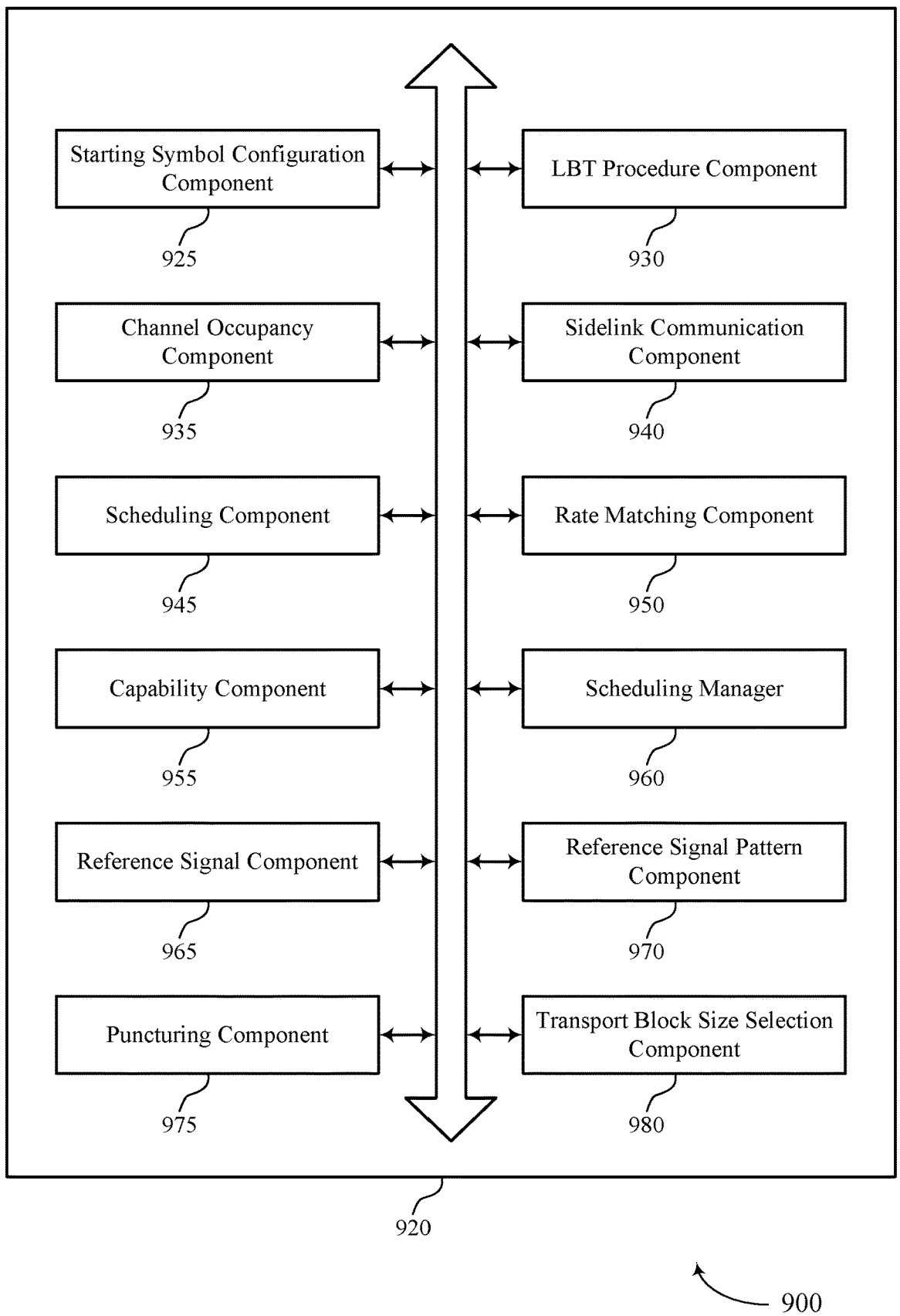
FIG. 9 shows a block diagram of a communications manager that supports rate matching for unlicensed sidelink channel access in accordance with one or more aspects of the present disclosure.

FIG. 9 shows a block diagram 900 of a communications manager 920 that supports rate matching for unlicensed sidelink channel access in accordance with one or more aspects of the present disclosure. The communications manager 920 may be an example of aspects of a communications manager 720, a communications manager 820, or both, as described herein. The communications manager 920, or various components thereof, may be an example of means for performing various aspects of rate matching for unlicensed sidelink channel access as described herein. For example, the communications manager 920 may include a starting symbol configuration component 925, an LBT procedure component 930, a channel occupancy component 935, a sidelink communication component 940, a scheduling component 945, a rate matching component 950, a capability component 955, a scheduling manager 960, a reference signal component 965, a reference signal pattern component 970, a puncturing component 975, a transport block size selection component 980, or any combination thereof. Each of these components may communicate, directly or indirectly, with one another (e.g., via one or more buses).

The communications manager 920 may support wireless communication at a transmitting UE in accordance with examples as disclosed herein. The starting symbol configuration component 925 may be configured as or otherwise support a means for receiving control information indicative of a set of multiple starting symbols in a first slot, the set of multiple starting symbols being within a resource pool for unlicensed sidelink communication, the set of multiple starting symbols including at least one default starting symbol and one or more subsequent starting symbols, each of the set of multiple starting symbols representing a potential starting symbol for transmission, by the transmitting UE, of a sidelink communication after the transmitting UE participates in a listen-before-talk procedure. The LBT procedure component 930 may be configured as or otherwise support a means for performing the listen-before-talk procedure during at least the first slot. The channel occupancy component 935 may be configured as or otherwise support a means for transmitting, to a receiving UE and based on performance of the listen-before-talk procedure during at least the first slot, at least an initial portion of the sidelink communication during a selected starting symbol of the set of multiple starting symbols, the selected starting symbol being one of the one or more subsequent starting symbols and representing a beginning of a channel occupancy duration of the transmitting UE.

In some examples, to support transmitting at least the initial portion of the sidelink communication during the selected starting symbol, the channel occupancy component 935 may be configured as or otherwise support a means for transmitting at least the initial portion during a next available starting symbol of the set of multiple starting symbols after the performance of the listen-before-talk procedure, the next available starting symbol being the selected starting symbol.

In some examples, the channel occupancy component 935 may be configured as or otherwise support a means for transmitting a second sidelink communication during the channel occupancy duration, transmission of the second sidelink communication starting during a default starting symbol of a second slot that is subsequent to the first slot.

In some examples, the scheduling component 945 may be configured as or otherwise support a means for scheduling the receiving UE to receive the sidelink communication during the first slot and after the listen-before-talk procedure based on a capability of the receiving UE.

In some examples, to support transmitting at least the initial portion of the sidelink communication during the selected starting symbol, the rate matching component 950 may be configured as or otherwise support a means for rate matching transmission of the sidelink communication during the first slot based on a set of data channel resource elements scheduled during a second slot of the channel occupancy duration. In some examples, to support transmitting at least the initial portion of the sidelink communication during the selected starting symbol, the channel occupancy component 935 may be configured as or otherwise support a means for transmitting the sidelink communication during the first slot based on the rate matched set of data channel resource elements.

In some examples, to support transmitting the sidelink communication during the first slot based on the rate matched set of data channel resource elements, the channel occupancy component 935 may be configured as or otherwise support a means for refraining from transmitting sidelink control information during the selected starting symbol of the first slot.

In some examples, the channel occupancy component 935 may be configured as or otherwise support a means for transmitting the sidelink control information during the second slot, the sidelink control information including an indication of the rate matching, an indication of the selected starting symbol in the first slot, or both.

In some examples, the reference signal component 965 may be configured as or otherwise support a means for refraining from transmitting demodulation reference signals during the first slot.

In some examples, the reference signal pattern component 970 may be configured as or otherwise support a means for identifying a pattern for a set of demodulation reference signals scheduled to be transmitted during the second slot. In some examples, the reference signal pattern component 970 may be configured as or otherwise support a means for applying the pattern to the first slot, where the pattern includes a first subset of demodulation reference signals scheduled to be transmitted in the first slot prior to the selected starting symbol and a second subset of demodulation reference signals scheduled to be transmitted in the first slot subsequent to the selected starting symbol. In some examples, the reference signal component 965 may be configured as or otherwise support a means for refraining from transmitting the first subset of demodulation reference signals scheduled for transmission during the first slot. In some examples, the reference signal component 965 may be configured as or otherwise support a means for transmitting the second subset of demodulation reference signals scheduled for transmission during the first slot.

In some examples, to support transmitting the sidelink communication during the first slot based on the rate matched set of data channel resource elements, the puncturing component 975 may be configured as or otherwise support a means for puncturing the sidelink communication during a portion of the first slot that occurs before the selected starting symbol.

In some examples, the channel occupancy component 935 may be configured as or otherwise support a means for transmitting, as the sidelink communication and during a set of resources starting from the selected starting symbol, a sidelink control channel transmission and a sidelink shared channel transmission, the sidelink control channel transmission starting from the selected starting symbol and including first sidelink control information.

In some examples, the first sidelink control information indicates a pattern of demodulation reference signals, and the reference signal component 965 may be configured as or otherwise support a means for transmitting the pattern of demodulated reference signals during the set of resources.

In some examples, a portion of the pattern is scheduled to occur outside of the first slot, and the reference signal component 965 may be configured as or otherwise support a means for refraining from transmitting the portion of the pattern. In some examples, a portion of the pattern is scheduled to occur outside of the first slot, and the reference signal component 965 may be configured as or otherwise support a means for refraining from transmitting the pattern based on an error condition arising due to the portion of the pattern being scheduled to occur outside of the first slot.

In some examples, the sidelink shared channel transmission includes second sidelink control information that is mapped to a data channel resource element in a symbol that is adjacent to a demodulation signal.

In some examples, the rate matching component 950 may be configured as or otherwise support a means for rate matching the sidelink shared channel transmission to a set of remaining symbols of the first slot, where the set of remaining symbols of the first slot include symbols of the first slot that occur after the selected starting symbol.

In some examples, the transport block size selection component 980 may be configured as or otherwise support a means for selecting a transport block size for the sidelink shared channel transmission based on a quantity of the remaining symbols in the set of remaining symbols.

In some examples, a quantity of starting symbols in the set of multiple starting symbols is based on a channel decoding hypothesis, a channel success rate, a channel quality metric, or any combination thereof.

Additionally, or alternatively, the communications manager 920 may support wireless communication at a receiving UE in accordance with examples as disclosed herein. In some examples, the starting symbol configuration component 925 may be configured as or otherwise support a means for receiving control information indicative of a set of multiple starting symbols in a first slot, the set of multiple starting symbols being within a resource pool for unlicensed sidelink communication, the set of multiple starting symbols including at least one default starting symbol and one or more subsequent starting symbols, each of the set of multiple starting symbols representing a potential starting symbol for monitoring, by the receiving UE, of a sidelink communication. The sidelink communication component 940 may be configured as or otherwise support a means for receiving, from a transmitting UE, at least a portion of the sidelink communication during one of the one or more subsequent starting symbols, the one of the one or more subsequent starting symbols representing a beginning of a channel occupancy duration of the transmitting UE.

In some examples, the sidelink communication component 940 may be configured as or otherwise support a means for monitoring for the sidelink communication during each of the set of multiple starting symbols.

In some examples, the control information further indicates the set of multiple starting symbols in a second slot, and the sidelink communication component 940 may be configured as or otherwise support a means for receiving a second sidelink communication during the channel occupancy duration, receipt of the second sidelink communication starting during a default starting symbol in a second slot that is subsequent to the first slot.

In some examples, the capability component 955 may be configured as or otherwise support a means for transmitting capability information of the receiving UE. In some examples, the scheduling manager 960 may be configured as or otherwise support a means for receiving scheduling information from the transmitting UE that schedules the receiving UE for the sidelink communication during the one of the one or more subsequent starting symbols based on the capability information of the receiving UE.

In some examples, to support receiving at least the portion of the sidelink communication during the one of the one or more subsequent starting symbols, the sidelink communication component 940 may be configured as or otherwise support a means for receiving the sidelink communication during the first slot as a rate matched transmission that is rate matched based on a set of data channel resource elements scheduled during a second slot of the channel occupancy duration.

In some examples, to support receiving at least the portion of the sidelink communication during the one of the one or more subsequent starting symbols, the sidelink communication component 940 may be configured as or otherwise support a means for receiving, as the sidelink communication and during a set of resources starting from the one of the one or more subsequent starting symbols, a sidelink control channel transmission and a sidelink shared channel transmission, the sidelink control channel transmission starting from the one of the one or more subsequent starting symbols and including a first sidelink control information.

In some examples, the first sidelink control information indicates a pattern of demodulation reference signals, and the sidelink communication component 940 may be configured as or otherwise support a means for receiving the pattern of demodulation reference signals during the set of resources.

In some examples, the sidelink communication component 940 may be configured as or otherwise support a means for receiving the sidelink shared channel transmission as a rate matched set of data channel resource elements in a set of remaining symbols of the first slot, where the set of remaining symbols of the first slot includes symbols of the first slot that occur after the one of the one or more subsequent starting symbols.

In some examples, to support receiving at least the portion of the sidelink communication during the one of the one or more subsequent starting symbols, the sidelink communication component 940 may be configured as or otherwise support a means for receiving a transport block whose transport block size for the sidelink shared channel transmission is based on a quantity of the remaining symbols in the set of remaining symbols.

Figure 10:
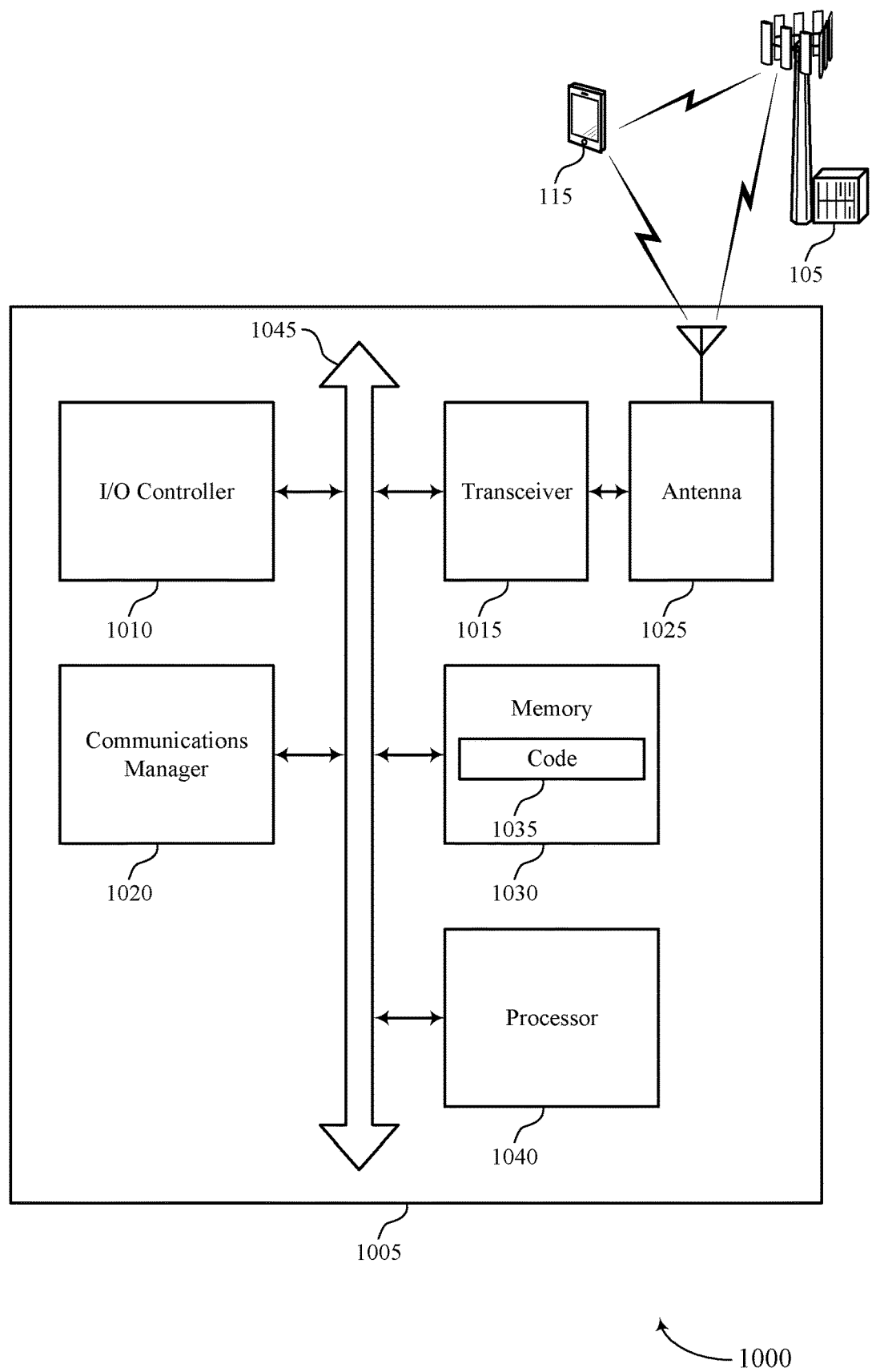
FIG. 10 shows a diagram of a system including a device that supports rate matching for unlicensed sidelink channel access in accordance with one or more aspects of the present disclosure.

FIG. 10 shows a diagram of a system 1000 including a device 1005 that supports rate matching for unlicensed sidelink channel access in accordance with one or more aspects of the present disclosure. The device 1005 may be an example of or include the components of a device 705, a device 805, or a UE 115 as described herein. The device 1005 may communicate (e.g., wirelessly) with one or more network entities 105, one or more UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally, or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting rate matching for unlicensed sidelink channel access). For example, the device 1005 or a component of the device 1005 may include a processor 1040 and memory 1030 coupled with or to the processor 1040, the processor 1040 and memory 1030 configured to perform various functions described herein.

The communications manager 1020 may support wireless communication at a transmitting UE in accordance with examples as disclosed herein. For example, the communications manager 1020 may be configured as or otherwise support a means for receiving control information indicative of a set of multiple starting symbols in a first slot, the set of multiple starting symbols being within a resource pool for unlicensed sidelink communication, the set of multiple starting symbols including at least one default starting symbol and one or more subsequent starting symbols, each of the set of multiple starting symbols representing a potential starting symbol for transmission, by the transmitting UE, of a sidelink communication after the transmitting UE participates in a listen-before-talk procedure. The communications manager 1020 may be configured as or otherwise support a means for performing the listen-before-talk procedure during at least the first slot. The communications manager 1020 may be configured as or otherwise support a means for transmitting, to a receiving UE and based on performance of the listen-before-talk procedure during at least the first slot, at least an initial portion of the sidelink communication during a selected starting symbol of the set of multiple starting symbols, the selected starting symbol being one of the one or more subsequent starting symbols and representing a beginning of a channel occupancy duration of the transmitting UE.

Additionally, or alternatively, the communications manager 1020 may support wireless communication at a receiving UE in accordance with examples as disclosed herein. For example, the communications manager 1020 may be configured as or otherwise support a means for receiving control information indicative of a set of multiple starting symbols in a first slot, the set of multiple starting symbols being within a resource pool for unlicensed sidelink communication, the set of multiple starting symbols including at least one default starting symbol and one or more subsequent starting symbols, each of the set of multiple starting symbols representing a potential starting symbol for monitoring, by the receiving UE, of a sidelink communication. The communications manager 1020 may be configured as or otherwise support a means for receiving, from a transmitting UE, at least a portion of the sidelink communication during one of the one or more subsequent starting symbols, the one of the one or more subsequent starting symbols representing a beginning of a channel occupancy duration of the transmitting UE.

By including or configuring the communications manager 1020 in accordance with examples as described herein, the device 1005 may support techniques for improved communication reliability, reduced latency, more efficient utilization of communication resources, improved coordination between devices, and enhanced medium access, among other examples.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of rate matching for unlicensed sidelink channel access as described herein, or the processor 1040 and the memory 1030 may be otherwise configured to perform or support such operations.

Figure 11:
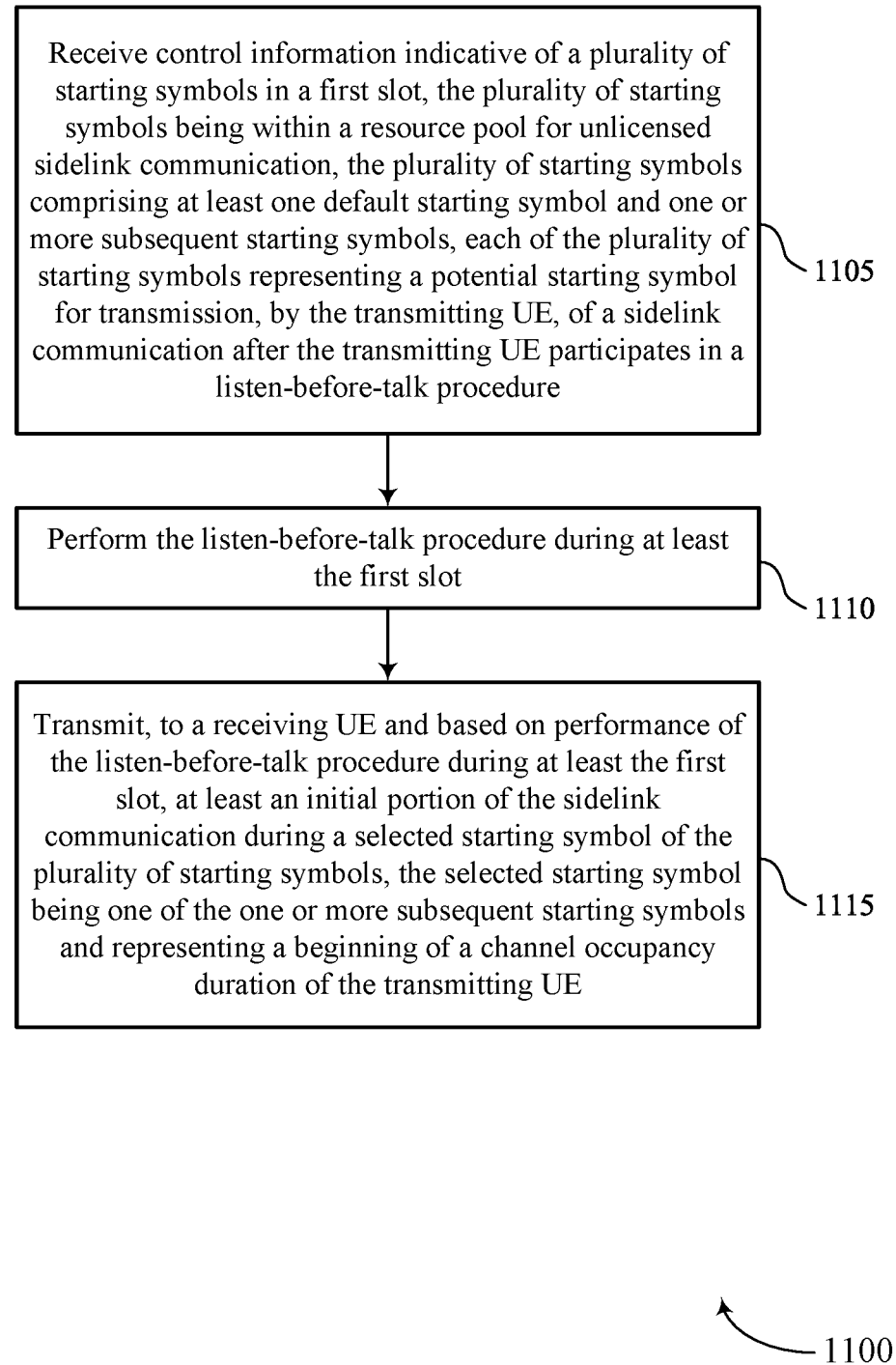
FIGS. 11 through 16 show flowcharts illustrating methods that support rate matching for unlicensed sidelink channel access in accordance with one or more aspects of the present disclosure.

FIG. 11 shows a flowchart illustrating a method 1100 that supports rate matching for unlicensed sidelink channel access in accordance with one or more aspects of the present disclosure. The operations of the method 1100 may be implemented by a UE or its components as described herein. For example, the operations of the method 1100 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1105, the method may include receiving control information indicative of a set of multiple starting symbols in a first slot, the set of multiple starting symbols being within a resource pool for unlicensed sidelink communication, the set of multiple starting symbols including at least one default starting symbol and one or more subsequent starting symbols, each of the set of multiple starting symbols representing a potential starting symbol for transmission, by the transmitting UE, of a sidelink communication after the transmitting UE participates in a listen-before-talk procedure. The operations of 1105 may be performed in accordance with examples as disclosed herein. In some examples, aspects of the operations of 1105 may be performed by a starting symbol configuration component 925 as described with reference to FIG. 9.

At 1110, the method may include performing the listen-before-talk procedure during at least the first slot. The operations of 1110 may be performed in accordance with examples as disclosed herein. In some examples, aspects of the operations of 1110 may be performed by an LBT procedure component 930 as described with reference to FIG. 9.

At 1115, the method may include transmitting, to a receiving UE and based on performance of the listen-before-talk procedure during at least the first slot, at least an initial portion of the sidelink communication during a selected starting symbol of the set of multiple starting symbols, the selected starting symbol being one of the one or more subsequent starting symbols and representing a beginning of a channel occupancy duration of the transmitting UE. The operations of 1115 may be performed in accordance with examples as disclosed herein. In some examples, aspects of the operations of 1115 may be performed by a channel occupancy component 935 as described with reference to FIG. 9.

Figure 12:
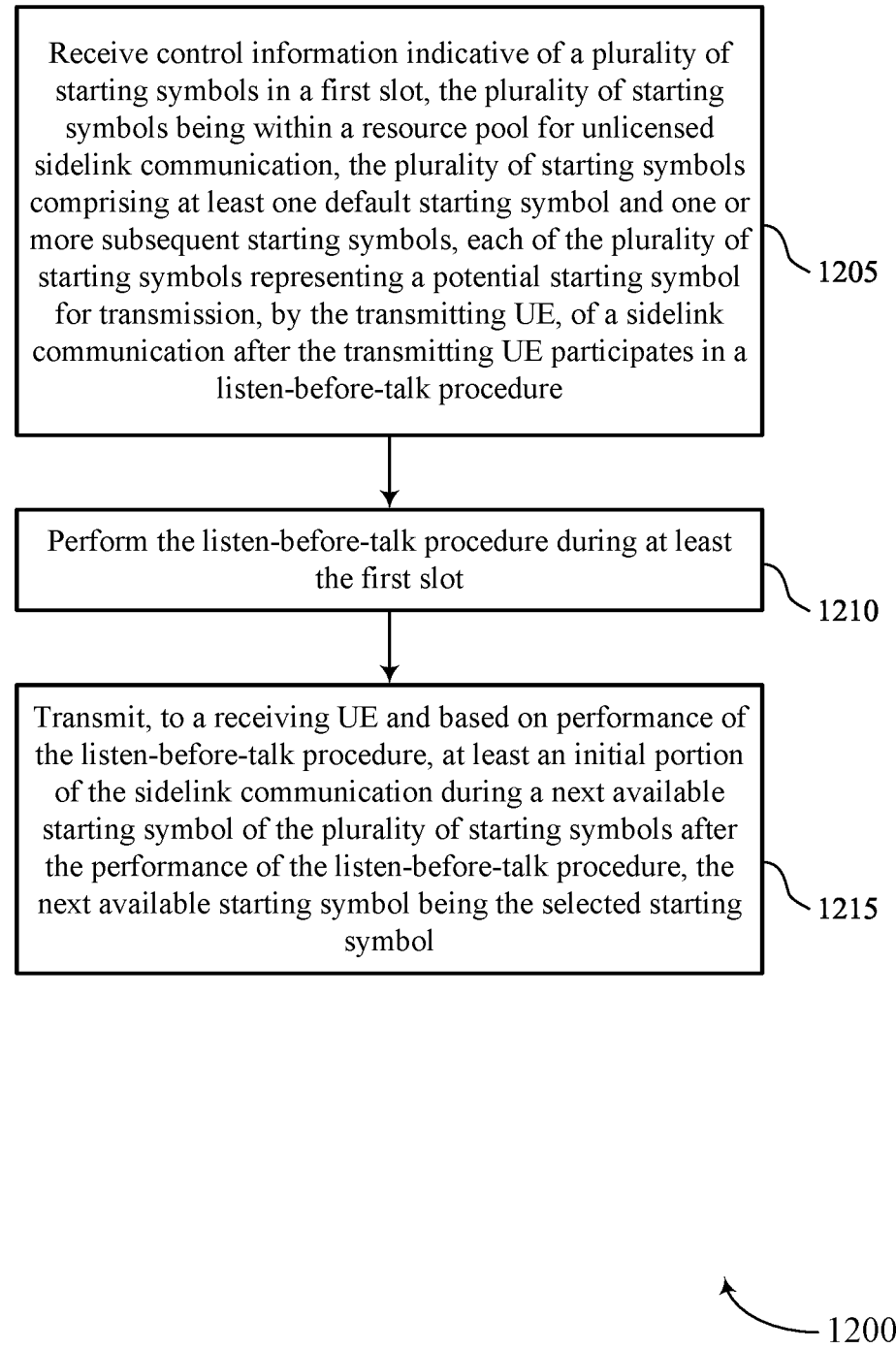

FIG. 12 shows a flowchart illustrating a method 1200 that supports rate matching for unlicensed sidelink channel access in accordance with one or more aspects of the present disclosure. The operations of the method 1200 may be implemented by a UE or its components as described herein. For example, the operations of the method 1200 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1205, the method may include receiving control information indicative of a set of multiple starting symbols in a first slot, the set of multiple starting symbols being within a resource pool for unlicensed sidelink communication, the set of multiple starting symbols including at least one default starting symbol and one or more subsequent starting symbols, each of the set of multiple starting symbols representing a potential starting symbol for transmission, by the transmitting UE, of a sidelink communication after the transmitting UE participates in a listen-before-talk procedure. The operations of 1205 may be performed in accordance with examples as disclosed herein. In some examples, aspects of the operations of 1205 may be performed by a starting symbol configuration component 925 as described with reference to FIG. 9.

At 1210, the method may include performing the listen-before-talk procedure during at least the first slot. The operations of 1210 may be performed in accordance with examples as disclosed herein. In some examples, aspects of the operations of 1210 may be performed by an LBT procedure component 930 as described with reference to FIG. 9.

At 1215, the method may include transmitting, to a receiving UE and based on performance of the listen-before-talk procedure, at least an initial portion of the sidelink communication during a next available starting symbol of the plurality of starting symbols after the performance of the listen-before-talk procedure, the next available starting symbol being the selected starting symbol. The operations of 1215 may be performed in accordance with examples as disclosed herein. In some examples, aspects of the operations of 1215 may be performed by a channel occupancy component 935 as described with reference to FIG. 9.

Figure 13:
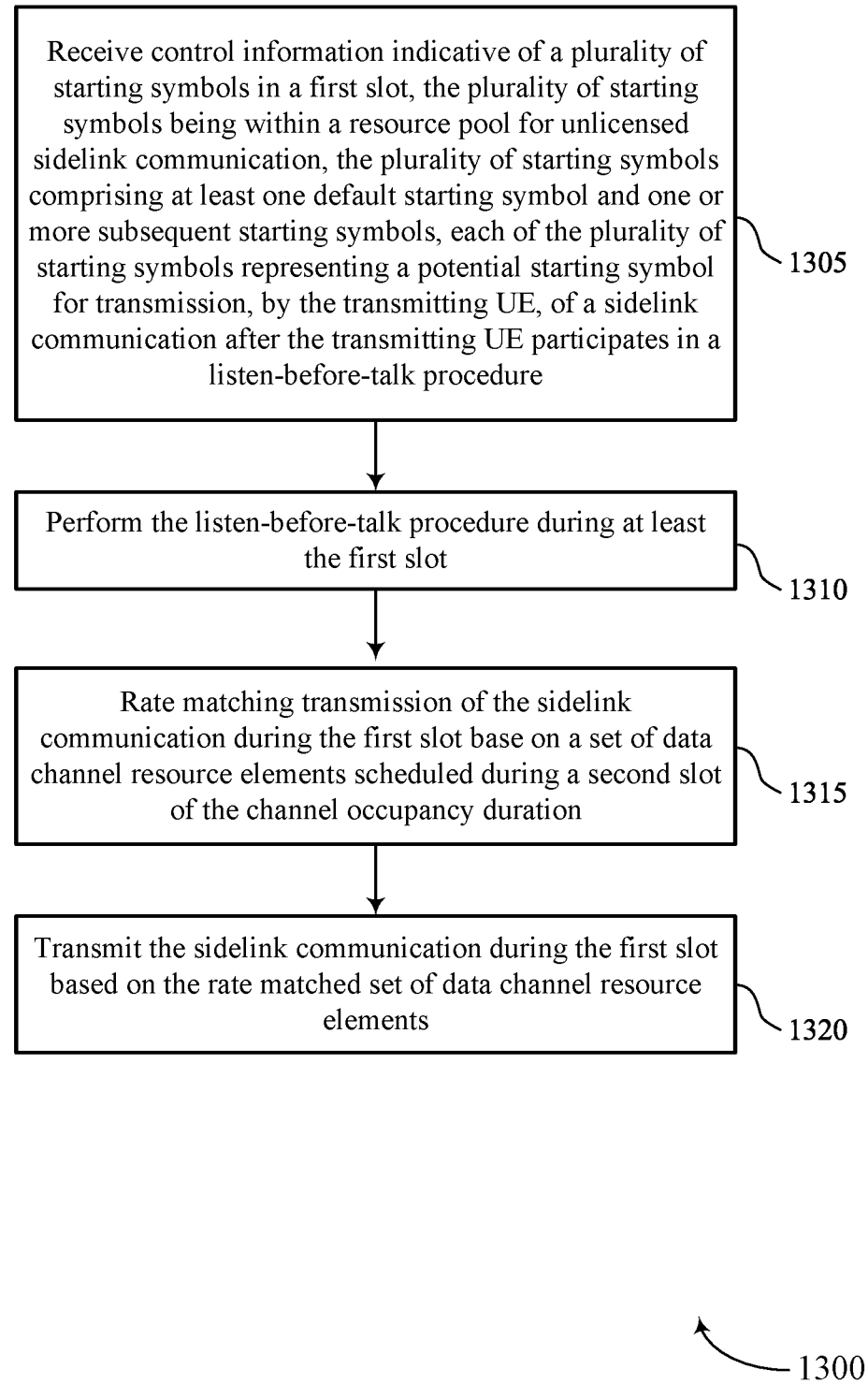

FIG. 13 shows a flowchart illustrating a method 1300 that supports rate matching for unlicensed sidelink channel access in accordance with one or more aspects of the present disclosure. The operations of the method 1300 may be implemented by a UE or its components as described herein. For example, the operations of the method 1300 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1305, the method may include receiving control information indicative of a set of multiple starting symbols in a first slot, the set of multiple starting symbols being within a resource pool for unlicensed sidelink communication, the set of multiple starting symbols including at least one default starting symbol and one or more subsequent starting symbols, each of the set of multiple starting symbols representing a potential starting symbol for transmission, by the transmitting UE, of a sidelink communication after the transmitting UE participates in a listen-before-talk procedure. The operations of 1305 may be performed in accordance with examples as disclosed herein. In some examples, aspects of the operations of 1305 may be performed by a starting symbol configuration component 925 as described with reference to FIG. 9.

At 1310, the method may include performing the listen-before-talk procedure during at least the first slot. The operations of 1310 may be performed in accordance with examples as disclosed herein. In some examples, aspects of the operations of 1310 may be performed by an LBT procedure component 930 as described with reference to FIG. 9.

At 1315, the method may include rate matching transmission of the sidelink communication during the first slot based on a set of data channel resource elements scheduled during a second slot of the channel occupancy duration. The operations of 1315 may be performed in accordance with examples as disclosed herein. In some examples, aspects of the operations of 1315 may be performed by a rate matching component 950 as described with reference to FIG. 9.

At 1320, the method may include transmitting the sidelink communication during the first slot based on the rate matched set of data channel resource elements. The operations of 1320 may be performed in accordance with examples as disclosed herein. In some examples, aspects of the operations of 1320 may be performed by a channel occupancy component 935 as described with reference to FIG. 9.

Figure 14:
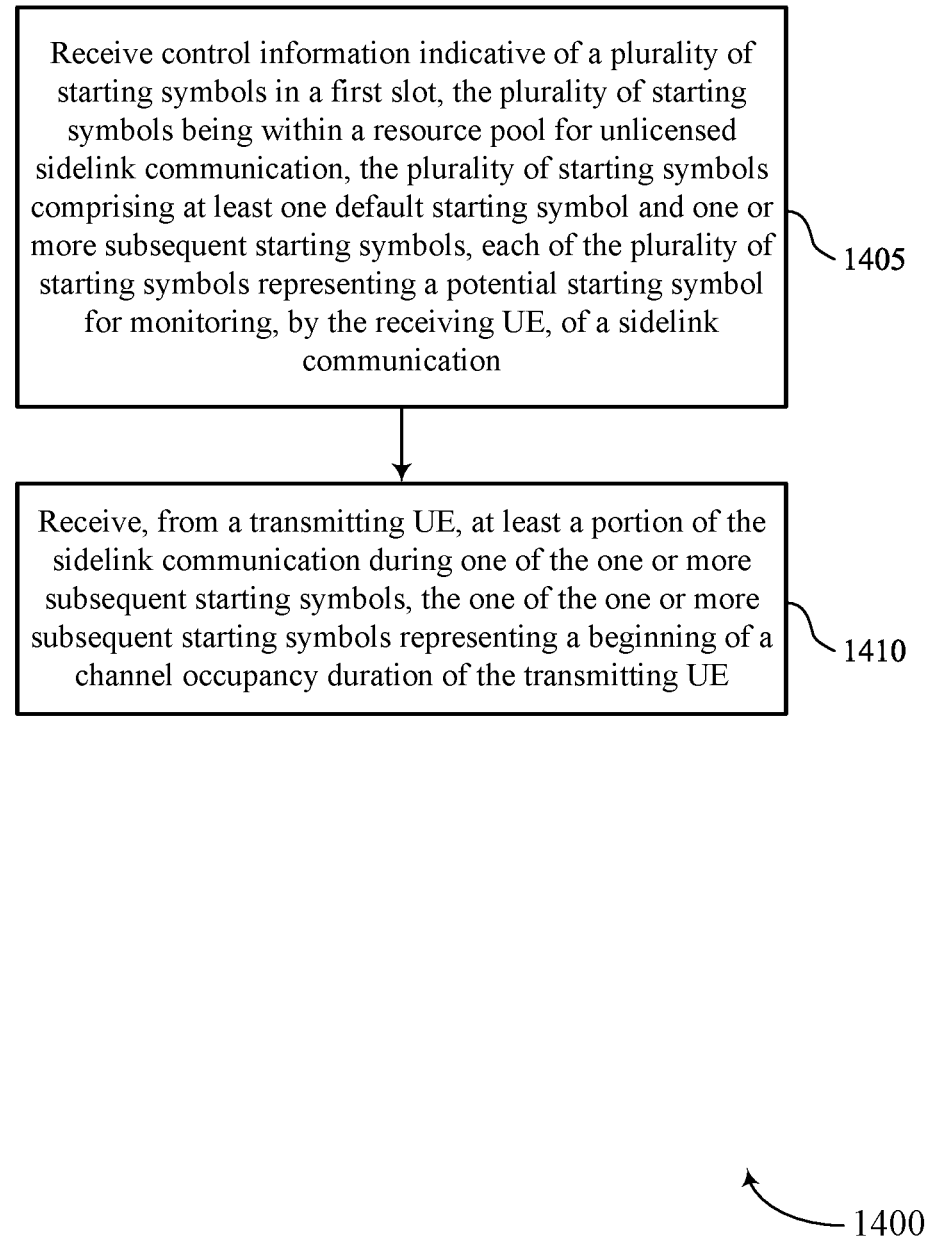

FIG. 14 shows a flowchart illustrating a method 1400 that supports rate matching for unlicensed sidelink channel access in accordance with one or more aspects of the present disclosure. The operations of the method 1400 may be implemented by a UE or its components as described herein. For example, the operations of the method 1400 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1405, the method may include receiving control information indicative of a set of multiple starting symbols in a first slot, the set of multiple starting symbols being within a resource pool for unlicensed sidelink communication, the set of multiple starting symbols including at least one default starting symbol and one or more subsequent starting symbols, each of the set of multiple starting symbols representing a potential starting symbol for monitoring, by the receiving UE, of a sidelink communication. The operations of 1405 may be performed in accordance with examples as disclosed herein. In some examples, aspects of the operations of 1405 may be performed by a starting symbol configuration component 925 as described with reference to FIG. 9.

At 1410, the method may include receiving, from a transmitting UE, at least a portion of the sidelink communication during one of the one or more subsequent starting symbols, the one of the one or more subsequent starting symbols representing a beginning of a channel occupancy duration of the transmitting UE. The operations of 1410 may be performed in accordance with examples as disclosed herein. In some examples, aspects of the operations of 1410 may be performed by a sidelink communication component 940 as described with reference to FIG. 9.

Figure 15:
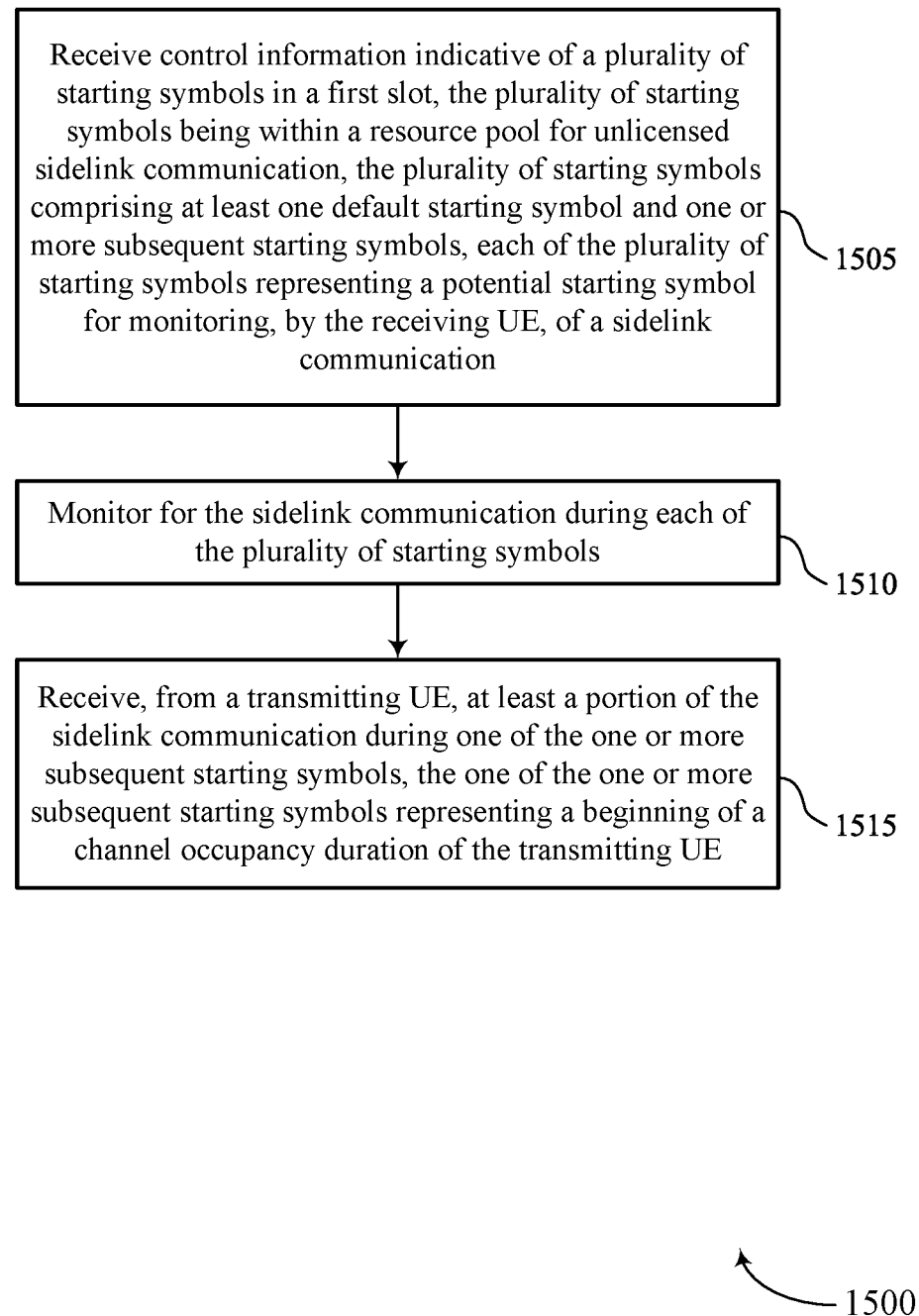

FIG. 15 shows a flowchart illustrating a method 1500 that supports rate matching for unlicensed sidelink channel access in accordance with one or more aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1505, the method may include receiving control information indicative of a set of multiple starting symbols in a first slot, the set of multiple starting symbols being within a resource pool for unlicensed sidelink communication, the set of multiple starting symbols including at least one default starting symbol and one or more subsequent starting symbols, each of the set of multiple starting symbols representing a potential starting symbol for monitoring, by the receiving UE, of a sidelink communication. The operations of 1505 may be performed in accordance with examples as disclosed herein. In some examples, aspects of the operations of 1505 may be performed by a starting symbol configuration component 925 as described with reference to FIG. 9.

At 1510, the method may include monitoring for the sidelink communication during each of the set of multiple starting symbols. The operations of 1510 may be performed in accordance with examples as disclosed herein. In some examples, aspects of the operations of 1510 may be performed by a sidelink communication component 940 as described with reference to FIG. 9.

At 1515, the method may include receiving, from a transmitting UE, at least a portion of the sidelink communication during one of the one or more subsequent starting symbols, the one of the one or more subsequent starting symbols representing a beginning of a channel occupancy duration of the transmitting UE. The operations of 1515 may be performed in accordance with examples as disclosed herein. In some examples, aspects of the operations of 1515 may be performed by a sidelink communication component 940 as described with reference to FIG. 9.

Figure 16:
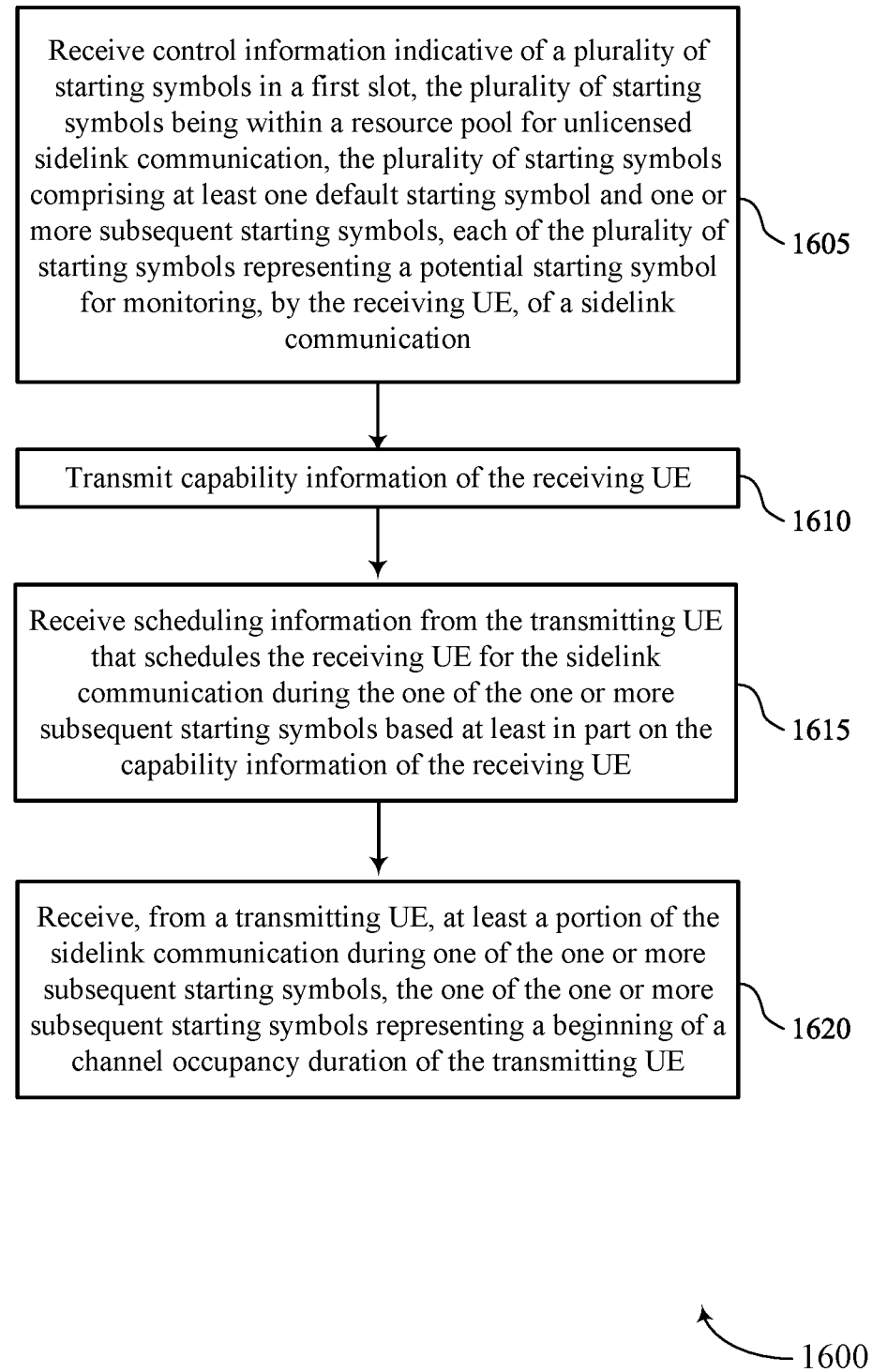

FIG. 16 shows a flowchart illustrating a method 1600 that supports rate matching for unlicensed sidelink channel access in accordance with one or more aspects of the present disclosure. The operations of the method 1600 may be implemented by a UE or its components as described herein. For example, the operations of the method 1600 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1605, the method may include receiving control information indicative of a set of multiple starting symbols in a first slot, the set of multiple starting symbols being within a resource pool for unlicensed sidelink communication, the set of multiple starting symbols including at least one default starting symbol and one or more subsequent starting symbols, each of the set of multiple starting symbols representing a potential starting symbol for monitoring, by the receiving UE, of a sidelink communication. The operations of 1605 may be performed in accordance with examples as disclosed herein. In some examples, aspects of the operations of 1605 may be performed by a starting symbol configuration component 925 as described with reference to FIG. 9.

At 1610, the method may include transmitting capability information of the receiving UE. The operations of 1610 may be performed in accordance with examples as disclosed herein. In some examples, aspects of the operations of 1610 may be performed by a capability component 955 as described with reference to FIG. 9.

At 1615, the method may include receiving scheduling information from the transmitting UE that schedules the receiving UE for the sidelink communication during the one of the one or more subsequent starting symbols based on the capability information of the receiving UE. The operations of 1615 may be performed in accordance with examples as disclosed herein. In some examples, aspects of the operations of 1615 may be performed by a scheduling manager 960 as described with reference to FIG. 9.

At 1620, the method may include receiving, from a transmitting UE, at least a portion of the sidelink communication during one of the one or more subsequent starting symbols, the one of the one or more subsequent starting symbols representing a beginning of a channel occupancy duration of the transmitting UE. The operations of 1620 may be performed in accordance with examples as disclosed herein. In some examples, aspects of the operations of 1620 may be performed by a sidelink communication component 940 as described with reference to FIG. 9.

The following provides an overview of aspects of the present disclosure:

Aspect 1: A method for wireless communication at a transmitting UE, comprising: receiving control information indicative of a plurality of starting symbols in a first slot, the plurality of starting symbols being within a resource pool for unlicensed sidelink communication, the plurality of starting symbols comprising at least one default starting symbol and one or more subsequent starting symbols, each of the plurality of starting symbols representing a potential starting symbol for transmission, by the transmitting UE, of a sidelink communication after the transmitting UE participates in a listen-before-talk procedure; performing the listen-before-talk procedure during at least the first slot; and transmitting, to a receiving UE and based on performance of the listen-before-talk procedure during at least the first slot, at least an initial portion of the sidelink communication during a selected starting symbol of the plurality of starting symbols, the selected starting symbol being one of the one or more subsequent starting symbols and representing a beginning of a channel occupancy duration of the transmitting UE.

Aspect 2: The method of aspect 1, wherein transmitting at least the initial portion of the sidelink communication during the selected starting symbol comprises: transmitting at least the initial portion during a next available starting symbol of the plurality of starting symbols after the performance of the listen-before-talk procedure, the next available starting symbol being the selected starting symbol.

Aspect 3: The method of aspect 2, further comprising: transmitting a second sidelink communication during the channel occupancy time, transmission of the second sidelink communication starting during a default starting symbol of a second slot that is subsequent to the first slot.

Aspect 4: The method of any of aspects 1 through 3, further comprising: scheduling the receiving UE to receive the sidelink communication during the first slot and after the listen-before-talk procedure based at least in part on a capability of the receiving UE.

Aspect 5: The method of any of aspects 1 through 4, wherein transmitting at least the initial portion of the sidelink communication during the selected starting symbol comprises: rate matching transmission of the sidelink communication during the first slot based on a set of data channel resource elements scheduled during a second slot of the channel occupancy duration; and transmitting the sidelink communication during the first slot based on the rate matched set of data channel resource elements.

Aspect 6: The method of aspect 5, wherein transmitting the sidelink communication during the first slot based on the rate matched set of data channel resource elements further comprises: refraining from transmitting sidelink control information during the selected starting symbol of the first slot.

Aspect 7: The method of aspect 6, further comprising: transmitting the sidelink control information during the second slot, the sidelink control information comprising an indication of the rate matching, an indication of the selected starting symbol in the first slot, or both.

Aspect 8: The method of any of aspects 5 through 7, further comprising: refraining from transmitting demodulation reference signals during the first slot.

Aspect 9: The method of any of aspects 5 through 7, further comprising: identifying a pattern for a set of demodulation reference signals scheduled to be transmitted during the second slot; applying the pattern to the first slot, wherein the pattern includes a first subset of demodulation reference signals scheduled to be transmitted in the first slot prior to the selected starting symbol and a second subset of demodulation reference signals scheduled to be transmitted in the first slot subsequent to the selected starting symbol; refraining from transmitting the first subset of demodulation reference signals scheduled for transmission during the first slot; and transmitting the second subset of demodulation reference signals scheduled for transmission during the first slot.

Aspect 10: The method of any of aspects 5 through 9, wherein transmitting the sidelink communication during the first slot based on the rate matched set of data channel resource elements further comprises: puncturing the sidelink communication during a portion of the first slot that occurs before the selected starting symbol.

Aspect 11: The method of any of aspects 1 through 10, further comprising: transmitting, as the sidelink communication and during a set of resources starting from the selected starting symbol, a sidelink control channel transmission and a sidelink shared channel transmission, the sidelink control channel transmission starting from the selected starting symbol and including first sidelink control information.

Aspect 12: The method of aspect 11, wherein the first sidelink control information indicates a pattern of demodulation reference signals, the method further comprising: transmitting the pattern of demodulated reference signals during the set of resources.

Aspect 13: The method of any of aspects 11 through 12, wherein the first sidelink control information indicates a pattern of demodulation reference signals and wherein a portion of the pattern is scheduled to occur outside of the first slot, the method further comprising: refraining from transmitting the portion of the pattern; or refraining from transmitting the pattern based at least in part on an error condition arising due to the portion of the pattern being scheduled to occur outside of the first slot.

Aspect 14: The method of any of aspects 11 through 13, wherein the sidelink shared channel transmission includes second sidelink control information that is mapped to a data channel resource element in a symbol that is adjacent to a demodulation signal.

Aspect 15: The method of any of aspects 11 through 14, further comprising: rate matching the sidelink shared channel transmission to a set of remaining symbols of the first slot, wherein the set of remaining symbols of the first slot comprise symbols of the first slot that occur after the selected starting symbol.

Aspect 16: The method of aspect 15, further comprising: selecting a transport block size for the sidelink shared channel transmission based at least in part on a quantity of the remaining symbols in the set of remaining symbols.

Aspect 17: The method of any of aspects 1 through 16, wherein a quantity of starting symbols in the plurality of starting symbols is based at least in part on a channel decoding hypothesis, a channel success rate, a channel quality metric, or any combination thereof.

Aspect 18: A method for wireless communication at a receiving UE, comprising: receiving control information indicative of a plurality of starting symbols in a first slot, the plurality of starting symbols being within a resource pool for unlicensed sidelink communication, the plurality of starting symbols comprising at least one default starting symbol and one or more subsequent starting symbols, each of the plurality of starting symbols representing a potential starting symbol for monitoring, by the receiving UE, of a sidelink communication; and receiving, from a transmitting UE, at least a portion of the sidelink communication during one of the one or more subsequent starting symbols, the one of the one or more subsequent starting symbols representing a beginning of a channel occupancy duration of the transmitting UE.

Aspect 19: The method of aspect 18, further comprising: monitoring for the sidelink communication during each of the plurality of starting symbols.

Aspect 20: The method of any of aspects 18 through 19, wherein the control information further indicates the plurality of starting symbols in a second slot, the method further comprising: receiving a second sidelink communication during the channel occupancy time, receipt of the second sidelink communication starting during a default starting symbol in a second slot that is subsequent to the first slot.

Aspect 21: The method of any of aspects 18 through 20, further comprising: transmitting capability information of the receiving UE; and receiving scheduling information from the transmitting UE that schedules the receiving UE for the sidelink communication during the one of the one or more subsequent starting symbols based at least in part on the capability information of the receiving UE.

Aspect 22: The method of any of aspects 18 through 21, wherein receiving at least the portion of the sidelink communication during the one of the one or more subsequent starting symbols comprises: receiving the sidelink communication during the first slot as a rate matched transmission that is rate matched based on a set of data channel resource elements scheduled during a second slot of the channel occupancy duration.

Aspect 23: The method of any of aspects 18 through 22, wherein receiving at least the portion of the sidelink communication during the one of the one or more subsequent starting symbols comprises: receiving, as the sidelink communication and during a set of resources starting from the one of the one or more subsequent starting symbols, a sidelink control channel transmission and a sidelink shared channel transmission, the sidelink control channel transmission starting from the one of the one or more subsequent starting symbols and including a first sidelink control information.

Aspect 24: The method of aspect 23, wherein the first sidelink control information indicates a pattern of demodulation reference signals, the method further comprising: receiving the pattern of demodulation reference signals during the set of resources.

Aspect 25: The method of any of aspects 23 through 24, further comprising: receiving the sidelink shared channel transmission as a rate matched set of data channel resource elements in a set of remaining symbols of the first slot, wherein the set of remaining symbols of the first slot comprises symbols of the first slot that occur after the one of the one or more subsequent starting symbols.

Aspect 26: The method of aspect 25, wherein receiving at least the portion of the sidelink communication during the one of the one or more subsequent starting symbols comprises: receiving a transport block whose transport block size for the sidelink shared channel transmission is based at least in part on a quantity of the remaining symbols in the set of remaining symbols.

Aspect 27: An apparatus for wireless communication at a transmitting UE, comprising a processor; memory coupled with the processor; and instructions stored in the memory and executable by the processor to cause the apparatus to perform a method of any of aspects 1 through 17.

Aspect 28: An apparatus for wireless communication at a transmitting UE, comprising at least one means for performing a method of any of aspects 1 through 17.

Aspect 29: A non-transitory computer-readable medium storing code for wireless communication at a transmitting UE, the code comprising instructions executable by a processor to perform a method of any of aspects 1 through 17.

Aspect 30: An apparatus for wireless communication at a receiving UE, comprising a processor; memory coupled with the processor; and instructions stored in the memory and executable by the processor to cause the apparatus to perform a method of any of aspects 18 through 26.

Aspect 31: An apparatus for wireless communication at a receiving UE, comprising at least one means for performing a method of any of aspects 18 through 26.

Aspect 32: A non-transitory computer-readable medium storing code for wireless communication at a receiving UE, the code comprising instructions executable by a processor to perform a method of any of aspects 18 through 26.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a transmitting user equipment (UE), comprising:
   receiving control information indicative of a plurality of starting symbols in a first slot, the plurality of starting symbols being within a resource pool for unlicensed sidelink communication, the plurality of starting symbols comprising at least one default starting symbol and one or more subsequent starting symbols, each of the plurality of starting symbols representing a potential starting symbol for transmission, by the transmitting UE, of a sidelink communication after the transmitting UE participates in a listen-before-talk procedure;
   performing the listen-before-talk procedure during at least the first slot;
   transmitting, to a receiving UE and based on performance of the listen-before-talk procedure during at least the first slot, at least an initial portion of the sidelink communication during a selected starting symbol of the plurality of starting symbols, the selected starting symbol being one of the one or more subsequent starting symbols and representing a beginning of a channel occupancy duration of the transmitting UE; and transmitting, to the receiving UE, a second sidelink communication during the channel occupancy duration, transmission of the second sidelink communication starting during a default starting symbol of a second slot that is subsequent to the first slot.

2. The method of claim 1, wherein transmitting at least the initial portion of the sidelink communication during the selected starting symbol comprises:
  transmitting at least the initial portion during a next available starting symbol of the plurality of starting symbols after the performance of the listen-before-talk procedure, the next available starting symbol being the selected starting symbol.

3. The method of claim 1, further comprising:
  scheduling the receiving UE to receive the sidelink communication during the first slot and after the listen-before-talk procedure based at least in part on a capability of the receiving UE.

4. The method of claim 1, wherein transmitting at least the initial portion of the sidelink communication during the selected starting symbol comprises:
  rate matching transmission of the sidelink communication during the first slot based on a set of data channel resource elements scheduled during the second slot of the channel occupancy duration; and
  transmitting the sidelink communication during the first slot based on the rate matched set of data channel resource elements.

5. The method of claim 4, wherein transmitting the sidelink communication during the first slot based on the rate matched set of data channel resource elements further comprises:
  refraining from transmitting sidelink control information during the selected starting symbol of the first slot.

6. The method of claim 5, further comprising:
  transmitting the sidelink control information during the second slot, the sidelink control information comprising an indication of the rate matching, an indication of the selected starting symbol in the first slot, or both.

7. The method of claim 4, further comprising:
  refraining from transmitting demodulation reference signals during the first slot.

8. The method of claim 4, further comprising:
  identifying a pattern for a set of demodulation reference signals scheduled to be transmitted during the second slot;
  applying the pattern to the first slot, wherein the pattern includes a first subset of demodulation reference signals scheduled to be transmitted in the first slot prior to the selected starting symbol and a second subset of demodulation reference signals scheduled to be transmitted in the first slot subsequent to the selected starting symbol;
  refraining from transmitting the first subset of demodulation reference signals scheduled for transmission during the first slot; and
  transmitting the second subset of demodulation reference signals scheduled for transmission during the first slot.

9. The method of claim 4, wherein transmitting the sidelink communication during the first slot based on the rate matched set of data channel resource elements further comprises:
  puncturing the sidelink communication during a portion of the first slot that occurs before the selected starting symbol.

10. The method of claim 1, further comprising:
  transmitting, as the sidelink communication and during a set of resources starting from the selected starting symbol, a sidelink control channel transmission and a sidelink shared channel transmission, the sidelink control channel transmission starting from the selected starting symbol and including first sidelink control information.

11. The method of claim 10, wherein the first sidelink control information indicates a pattern of demodulation reference signals, the method further comprising:
  transmitting the pattern of demodulated reference signals during the set of resources.

12. The method of claim 10, wherein the first sidelink control information indicates a pattern of demodulation reference signals and wherein a portion of the pattern is scheduled to occur outside of the first slot, the method further comprising:
  refraining from transmitting the portion of the pattern; or
  refraining from transmitting the pattern based at least in part on an error condition arising due to the portion of the pattern being scheduled to occur outside of the first slot.

13. The method of claim 10, wherein the sidelink shared channel transmission includes second sidelink control information that is mapped to a data channel resource element in a symbol that is adjacent to a demodulation signal.

14. The method of claim 10, further comprising:
  rate matching the sidelink shared channel transmission to a set of remaining symbols of the first slot, wherein the set of remaining symbols of the first slot comprise symbols of the first slot that occur after the selected starting symbol.

15. The method of claim 14, further comprising:
  selecting a transport block size for the sidelink shared channel transmission based at least in part on a quantity of remaining symbols in the set of remaining symbols.

16. The method of claim 1, wherein a quantity of starting symbols in the plurality of starting symbols is based at least in part on a channel decoding hypothesis, a channel success rate, a channel quality metric, or any combination thereof.

17. A method for wireless communication at a receiving user equipment (UE), comprising:
  receiving control information indicative of a plurality of starting symbols in a first slot, the plurality of starting symbols being within a resource pool for unlicensed sidelink communication, the plurality of starting symbols comprising at least one default starting symbol and one or more subsequent starting symbols, each of the plurality of starting symbols representing a potential starting symbol for monitoring, by the receiving UE, of a sidelink communication;
  receiving, from a transmitting UE, at least a portion of the sidelink communication during one of the one or more subsequent starting symbols, the one of the one or more subsequent starting symbols representing a beginning of a channel occupancy duration of the transmitting UE; and
  receiving, from the transmitting UE, a second sidelink communication during the channel occupancy duration, receipt of the second sidelink communication starting during a default starting symbol in a second slot that is subsequent to the first slot.

18. The method of claim 17, further comprising:

monitoring for the sidelink communication during each of the plurality of starting symbols.

19. The method of claim 17, wherein the control information further indicates the plurality of starting symbols in the second slot.

20. The method of claim 17, further comprising:
transmitting capability information of the receiving UE; and
receiving scheduling information from the transmitting UE that schedules the receiving UE for the sidelink communication during the one of the one or more subsequent starting symbols based at least in part on the capability information of the receiving UE.

21. The method of claim 17, wherein receiving at least the portion of the sidelink communication during the one of the one or more subsequent starting symbols comprises:
receiving the sidelink communication during the first slot as a rate matched transmission that is rate matched based on a set of data channel resource elements scheduled during the second slot of the channel occupancy duration.

22. The method of claim 17, wherein receiving at least the portion of the sidelink communication during the one of the one or more subsequent starting symbols comprises:
receiving, as the sidelink communication and during a set of resources starting from the one of the one or more subsequent starting symbols, a sidelink control channel transmission and a sidelink shared channel transmission, the sidelink control channel transmission starting from the one of the one or more subsequent starting symbols and including a first sidelink control information.

23. The method of claim 22, wherein the first sidelink control information indicates a pattern of demodulation reference signals, the method further comprising:
receiving the pattern of demodulation reference signals during the set of resources.

24. The method of claim 22, further comprising:
receiving the sidelink shared channel transmission as a rate matched set of data channel resource elements in a set of remaining symbols of the first slot, wherein the set of remaining symbols of the first slot comprises symbols of the first slot that occur after the one of the one or more subsequent starting symbols.

25. The method of claim 24, wherein receiving at least the portion of the sidelink communication during the one of the one or more subsequent starting symbols comprises:
receiving a transport block whose transport block size for the sidelink shared channel transmission is based at least in part on a quantity of remaining symbols in the set of remaining symbols.

26. An apparatus for wireless communication at a transmitting user equipment (UE), comprising:
one or more processors;
one or more memories coupled with the one or more processors; and
instructions stored in the one or more memories and executable by the one or more processors to cause the apparatus to:
receive control information indicative of a plurality of starting symbols in a first slot, the plurality of starting symbols being within a resource pool for unlicensed sidelink communication, the plurality of starting symbols comprising at least one default starting symbol and one or more subsequent starting symbols, each of the plurality of starting symbols representing a potential starting symbol for transmission, by the transmitting UE, of a sidelink communication after the transmitting UE participates in a listen-before-talk procedure;
perform the listen-before-talk procedure during at least the first slot; and
transmit, to a receiving UE and based on performance of the listen-before-talk procedure during at least the first slot, at least an initial portion of the sidelink communication during a selected starting symbol of the plurality of starting symbols, the selected starting symbol being one of the one or more subsequent starting symbols and representing a beginning of a channel occupancy duration of the transmitting UE; and
transmit, to the receiving UE, a second sidelink communication during the channel occupancy duration, transmission of the second sidelink communication starting during a default starting symbol of a second slot that is subsequent to the first slot.

27. The apparatus of claim 26, wherein the instructions to transmit at least the initial portion of the sidelink communication during the selected starting symbol are executable by the one or more processors to cause the apparatus to:
transmit at least the initial portion during a next available starting symbol of the plurality of starting symbols after the performance of the listen-before-talk procedure, the next available starting symbol being the selected starting symbol.

28. An apparatus for wireless communication at a receiving user equipment (UE), comprising:
one or more processors;
one or more memories coupled with the one or more processors; and
instructions stored in the one or more memories and executable by the one or more processors to cause the apparatus to:
receive control information indicative of a plurality of starting symbols in a first slot, the plurality of starting symbols being within a resource pool for unlicensed sidelink communication, the plurality of starting symbols comprising at least one default starting symbol and one or more subsequent starting symbols, each of the plurality of starting symbols representing a potential starting symbol for monitoring, by the receiving UE, of a sidelink communication;
receive, from a transmitting UE, at least a portion of the sidelink communication during one of the one or more subsequent starting symbols, the one of the one or more subsequent starting symbols representing a beginning of a channel occupancy duration of the transmitting UE; and
receive, from the transmitting UE, a second sidelink communication during the channel occupancy duration, receipt of the second sidelink communication starting during a default starting symbol in a second slot that is subsequent to the first slot.

* * * * *